(12) United States Patent
Callon et al.

(10) Patent No.: US 10,153,967 B2
(45) Date of Patent: Dec. 11, 2018

(54) DETERMINISTIC AND OPTIMIZED BIT INDEX EXPLICIT REPLICATION (BIER) FORWARDING

(71) Applicant: Juniper Networks, Inc., Sunnyvale, CA (US)

(72) Inventors: Ross Callon, Westford, MA (US); Zhaohui Zhang, Westford, MA (US); Hongwen Zhang, Lowell, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 103 days.

(21) Appl. No.: 14/754,371

(22) Filed: Jun. 29, 2015

(65) Prior Publication Data
US 2016/0134518 A1 May 12, 2016

Related U.S. Application Data

(63) Continuation-in-part of application No. 14/534,689, filed on Nov. 6, 2014.

(51) Int. Cl.
*H04L 12/707* (2013.01)
*H04L 12/741* (2013.01)
*H04L 12/733* (2013.01)
*H04L 12/761* (2013.01)

(52) U.S. Cl.
CPC .............. *H04L 45/24* (2013.01); *H04L 45/54* (2013.01); *H04L 45/16* (2013.01); *H04L 45/20* (2013.01); *H04L 45/745* (2013.01)

(58) Field of Classification Search
CPC ..... H04W 84/18; H04W 52/46; H04W 40/00; H04W 40/26; H04W 40/28; H04W 40/36; H04W 4/08; H04W 52/0219; H04W 72/005

USPC ......................................................... 370/390
See application file for complete search history.

(56) References Cited

U.S. PATENT DOCUMENTS

| 8,325,726 | B2 | 12/2012 | Baban et al. |
| 8,787,400 | B1 | 7/2014 | Barth et al. |
| 9,246,821 | B1 | 1/2016 | Li et al. |
| 9,438,505 | B1 | 9/2016 | Zhou et al. |
| 2008/0151890 | A1 | 6/2008 | Zelig et al. |

(Continued)

FOREIGN PATENT DOCUMENTS

| CA | 2540276 | 9/2007 |
| EP | 2854454 | 4/2015 |
| EP | 2899933 A1 | 7/2015 |

OTHER PUBLICATIONS

Extended European Search Report corresponding to EP Application No. 15171328.6, dated Apr. 4, 2016, 10 pages.

(Continued)

*Primary Examiner* — Natasha W Cosme
(74) *Attorney, Agent, or Firm* — Harrity & Harrity, LLP

(57) ABSTRACT

A network device creates a forwarding table that includes information associated with a set of destinations in a network, and determines next hops for the set of destinations. The network device populates the forwarding table with information associated with the next hops, and stores the forwarding table. The forwarding table is used to forward a multicast packet toward a multiple destinations, and includes separate entries that depend upon routes the multicast packet is to traverse towards destinations with multiple choices for next hops.

21 Claims, 15 Drawing Sheets

(56) References Cited

U.S. PATENT DOCUMENTS

| | | |
|---|---|---|
| 2011/0261812 A1 | 10/2011 | Kini et al. |
| 2014/0098675 A1 | 4/2014 | Frost et al. |
| 2014/0293786 A1* | 10/2014 | Lin .................... H04L 47/17 370/235 |
| 2015/0078377 A1 | 3/2015 | Wijnands et al. |
| 2016/0087890 A1 | 3/2016 | Pryzgienda et al. |

OTHER PUBLICATIONS

Wijnands et al., "Multicast using Bit Index Explicit Replication," Internet Engineering Task Force, Internet-Draft, draft-wijnands-bier-architecture-01, Oct. 16, 2014, 24 pages.

Extended European Search Report corresponding to EP Application No. 16175935.2, dated Aug. 25, 2016, 10 pages.

Psenak et al., "OSPF Extensions for BIER," https://tools.ietf.org/html/draft-psenak-ospf-bier-extensions-00, Sep. 27, 2014, 6 pages.

Rosen et al., "Multicast VPN Using BIER," https://tools.ietf.org/html/draft-rosen-l3vpn-mvpn-bier-00, Sep. 23, 2014, 8 pages.

Shepherd et al., "Bit Indexed Explicit Replication (BIER) Problem Statement," https://tools.ietf.org/html/draft-shepherd-bier-problem-statement-00, Sep. 25, 2014, 11 pages.

Wijnands et al., "Multicast using Bit Index Explicit Replication," https://tools.ietf.org/html/draft-wijnands-bier-architecture-00, Sep. 22, 2014, 24 pages.

Wijnands et al., "Multicast using Bit Index Explicit Replication," https://tools.ietf.org/html/draft-wijnands-bier-architecture-01, Oct. 16, 2014, 24 pages.

Wijnands et al., "Encapsulation for Bit Index Explicit Replication in MPLS Networks," https://toolsiettorg/html/draft-wijnands-mpls-bier-encapsulation-00, Sep. 22, 2014, 10 pages.

\* cited by examiner

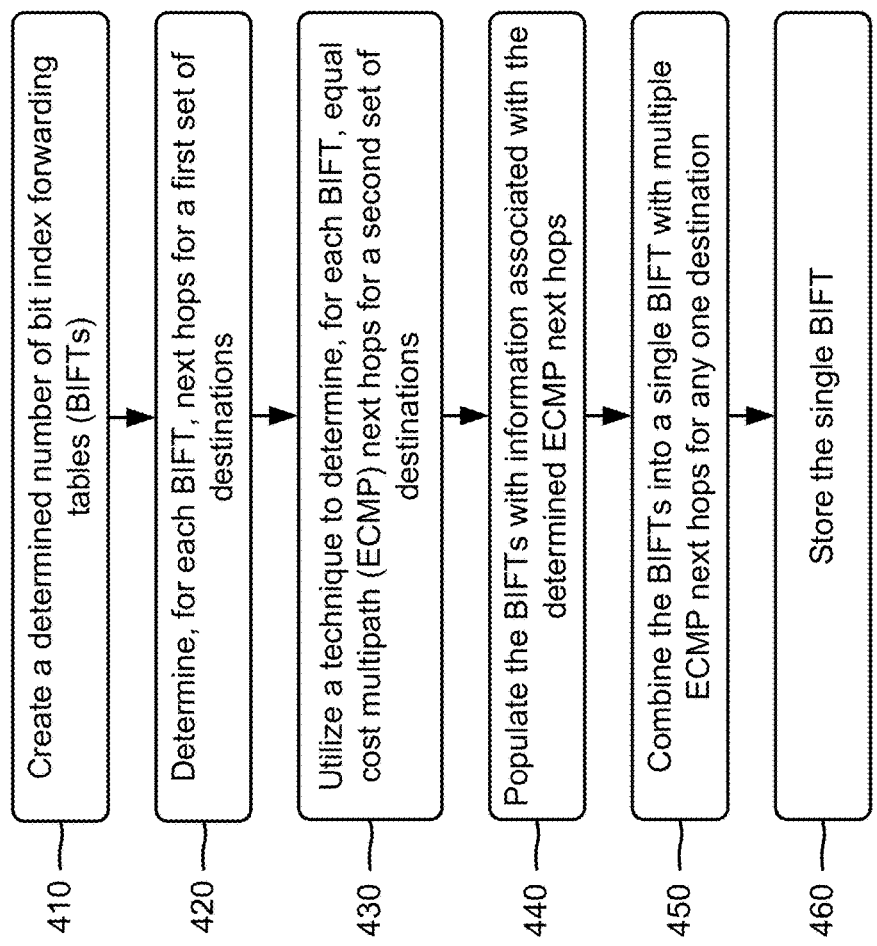

FIG. 5B

BIFT (510-1)

| BFR-id (SI:Bitstring) | F-BM | BFR-NBR |
|---|---|---|
| 1 (0:00001) | 00011 | C |
| 2 (0:00010) | 00011 | C |
| 3 (0:00100) | 10100 | E |
| 4 (0:01000) | 01000 | A |
| 5 (0:10000) | 10100 | E |

BIFT (510-2)

| BFR-id (SI:Bitstring) | F-BM | BFR-NBR |
|---|---|---|
| 1 (0:00001) | 00011 | C |
| 2 (0:00010) | 00011 | C |
| 3 (0:00100) | 10100 | E |
| 4 (0:01000) | 01000 | A |
| 5 (0:10000) | 10100 | E |

BIFT (510-3)

| BFR-id (SI:Bitstring) | F-BM | BFR-NBR |
|---|---|---|
| 1 (0:00001) | 10001 | C |
| 2 (0:00010) | 00110 | E |
| 3 (0:00100) | 00110 | E |
| 4 (0:01000) | 01000 | A |
| 5 (0:10000) | 10001 | C |

BIFT (510-4)

| BFR-id (SI:Bitstring) | F-BM | BFR-NBR |
|---|---|---|
| 1 (0:00001) | 10001 | C |
| 2 (0:00010) | 00110 | E |
| 3 (0:00100) | 00110 | E |
| 4 (0:01000) | 01000 | A |
| 5 (0:10000) | 10001 | C |

BIFT (510-1)

| BFR-id (SI:Bitstring) | F-BM | BFR-NBR |
|---|---|---|
| 1 (0:00001) | | |
| 2 (0:00010) | | |
| 3 (0:00100) | | |
| 4 (0:01000) | | |
| 5 (0:10000) | | |

BIFT (510-2)

| BFR-id (SI:Bitstring) | F-BM | BFR-NBR |
|---|---|---|
| 1 (0:00001) | | |
| 2 (0:00010) | | |
| 3 (0:00100) | | |
| 4 (0:01000) | | |
| 5 (0:10000) | | |

BIFT (510-3)

| BFR-id (SI:Bitstring) | F-BM | BFR-NBR |
|---|---|---|
| 1 (0:00001) | | |
| 2 (0:00010) | | |
| 3 (0:00100) | | |
| 4 (0:01000) | | |
| 5 (0:10000) | | |

BIFT (510-4)

| BFR-id (SI:Bitstring) | F-BM | BFR-NBR |
|---|---|---|
| 1 (0:00001) | | |
| 2 (0:00010) | | |
| 3 (0:00100) | | |
| 4 (0:01000) | | |
| 5 (0:10000) | | |

| BFR-id (SI:Bitstring) | F-BM | BFR-NBR |
|---|---|---|
| 1 (0:00001) | 00011<br>00011<br>10001<br>10001 | C1<br>C2<br>C3<br>C4 |
| 2 (0:00010) | 00011<br>00011<br>00110<br>00110 | C1<br>C2<br>E3<br>E4 |
| 3 (0:00100) | 10100<br>10100<br>00110<br>00110 | E1<br>E2<br>E3<br>E4 |
| 4 (0:01000) | 01000<br>01000<br>01000<br>01000 | A1<br>A2<br>A3<br>A4 |
| 5 (0:10000) | 10100<br>10100<br>10001<br>10001 | E1<br>E2<br>C3<br>C4 |

Single BIFT (540)

Multiple next hops (550)

500

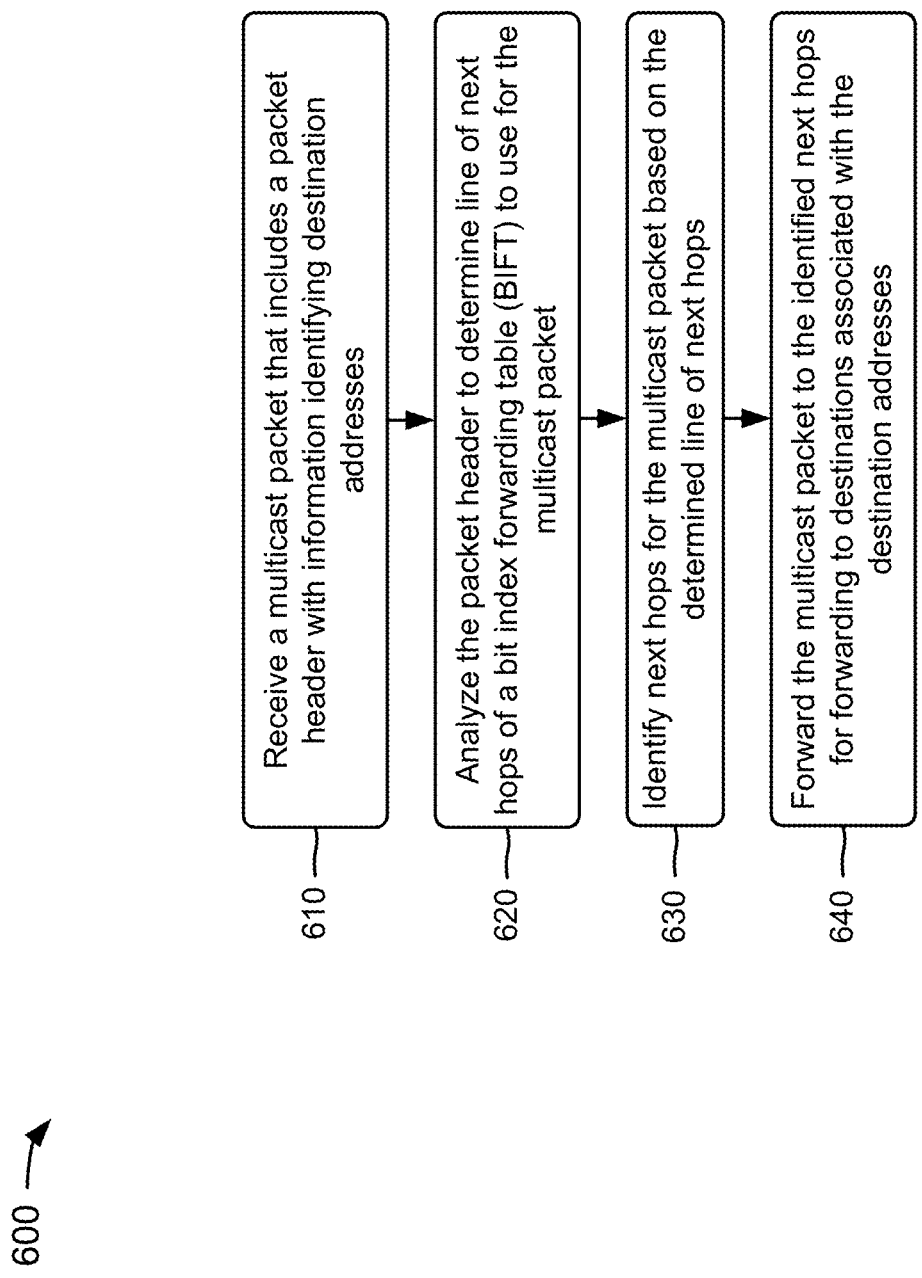

FIG. 7B

BIFT (710)

| BFR-id (SI:Bitstring) | F-BM | BFR-NBR |
|---|---|---|
| 1 (0:00001) | 00011<br>00011<br>10001<br>10001 | C1<br>C2<br>C3<br>C4 ← Determined line (740) |
| 2 (0:00010) | 00011<br>00011<br>00110<br>00110 | C1<br>C2<br>E3<br>E4 |
| 3 (0:00100) | 10100<br>10100<br>00110<br>00110 | E1<br>E2<br>E3<br>E4 |
| 4 (0:01000) | 01000<br>01000<br>01000<br>01000 | A1<br>A2<br>A3<br>A4 |
| 5 (0:10000) | 10100<br>10100<br>10001<br>10001 | E1<br>E2<br>C3<br>C4 |

700

DETERMINISTIC AND OPTIMIZED BIT INDEX EXPLICIT REPLICATION (BIER) FORWARDING

RELATED APPLICATION

This application is a continuation-in-part of U.S. patent application Ser. No. 14/534,689, filed on Nov. 6, 2014, the entire contents of which are hereby incorporated by reference.

BACKGROUND

Over time, network device (e.g., router) forwarding rates have increased rapidly, whereas control plane processing capabilities have increased at a slower rate. A ratio between forwarding plane speeds and control plane speeds is very large (e.g., a factor of one-thousand or greater) and has been increasing over time. Existing methods for Internet protocol (IP) multicast are relatively control-plane intensive. One approach, known as a bit index explicit replication (BIER) forwarding method, has been introduced into the Internet Engineering Task Force (IETF) to allow many multicast groups to be simultaneously supported with minimal state in a core of a network. In the BIER forwarding method, only an ingress router for any particular packet flow needs to know which egress routers are to receive any particular packet. The BIER forwarding method does not require any explicit tree-building protocol, nor does the BIER forwarding method require intermediate routers to maintain any per-flow state. A router that implements the BIER forwarding method is known as a bit-forwarding router (BFR).

In networks that include equal cost multipath (ECMP) or link aggregation groups (LAGs) (e.g., which are becoming more common as routers get faster), the BIER forwarding method results in non-deterministic paths for any one destination. In particular, a path that a packet takes to one destination depends upon which other destinations are also receiving the same packet. Thus, in a large multicast group, if one router or a few routers are alternately joining and leaving the multicast group, the path taken to other routers in the multicast group will fluctuate, which makes network operations, administration, and management (OAM) difficult. For example, with the BIER forwarding method, it may be difficult for a trace route technique to correctly determine a path taken for a particular destination by a particular flow of packets. The BIER forwarding method may also result in inconsistent performance and/or out of order delivery of packets to any particular destination. Given that the inconsistent performance may depend upon a path taken to a particular destination, it may be difficult to diagnose such inconsistent performance.

SUMMARY

In some implementations, a network device may include one or more processors to: create multiple forwarding tables, where each forwarding table includes information associated with a set of destinations; determine, for each of the multiple forwarding tables, next hops for the set of destinations; determine, for each of the multiple forwarding tables, equal cost multipath next hops for the set of destinations; populate the multiple forwarding tables with information associated with the next hops and the equal cost multipath next hops; and combine the multiple forwarding tables into a single forwarding table, where the single forwarding table is used to forward a multicast packet toward multiple destinations, and the single forwarding table includes separate entries that depend upon routes the multicast packet is to traverse towards destinations with multiple choices for next hops.

In some implementations, a method may include: creating, by a network device provided in a network, multiple forwarding tables, where each forwarding table includes information associated with a set of destinations; determining, by the network device and for each forwarding table, next hops for the set of destinations; determining, by the network device and for each forwarding table, equal cost multipath next hops for the set of destinations; populating, by the network device, the multiple forwarding tables with information associated with the next hops and the equal cost multipath next hops; and combining, by the network device, the multiple forwarding tables into a single forwarding table, where the single forwarding table is used to forward a multicast packet toward multiple destinations, and the single forwarding table includes separate entries that depend upon routes the multicast packet is to traverse towards destinations with multiple choices for next hops.

In some implementations, a bit-forwarding device may include one or more processors to: create multiple bit index forwarding tables, where each forwarding table includes information associated with a set of destinations; populate the multiple bit index forwarding tables with information associated with the set of destinations; and combine the multiple bit index forwarding tables into the single bit index forwarding table, where the single bit index forwarding table includes separate entries that depend upon routes a multicast packet is to traverse towards destinations with multiple choices for next hops.

In some implementations, a method may include: creating, by a network device provided in a network, a forwarding table that includes information associated with a set of destinations; determining, by the network device, next hops for the set of destinations; populating, by the network device, the forwarding table with information associated with the next hops; and storing, by the network device, the forwarding table, where the forwarding table is used to forward a multicast packet toward a plurality of destinations, and the forwarding table includes separate entries that depend upon routes the multicast packet is to traverse towards destinations with multiple choices for next hops.

BRIEF DESCRIPTION OF THE DRAWINGS

FIG. 4 is a flow chart of an example process for combining multiple bit index forwarding tables (BIFTs) in a network device;

FIGS. 5A-5F are diagrams of an example implementation relating to the example process shown in FIG. 4;

FIG. 6 is a flow chart of an example process for forwarding a multicast packet based on a BIFT; and FIGS. 7A-7D are diagrams of an example implementation relating to the example process shown in FIG. 6.

DETAILED DESCRIPTION

The following detailed description of example implementations refers to the accompanying drawings. The same reference numbers in different drawings may identify the same or similar elements.

The BIER forwarding method makes use of a bit index forwarding table (BIFT). In a network that does not include ECMP and LAGs, each potential destination for a packet may be represented by a unique single bit in a forwarding bit mask (F-BM)) and may have only a single possible next hop. Also, in a network that does not include ECMP and LAGs, each entry in the single BIFT (e.g., corresponding to a particular possible destination) includes a single row that specifies a single F-BM corresponding to a particular next hop. However, in a network that includes ECMP and/or LAGs, some entries in the single BIFT will contain multiple rows that correspond to multiple possible next hops (e.g., with a different F-BM for each next hop). Which entry is selected may depend upon a hash performed on a packet being forwarded. For example, the hash may be based on IP source and destination addresses, an IP protocol field, transmission control protocol (TCP) ports, and/or user datagram protocol (UDP) ports. In such situations, a bit representing any one particular destination may exist in the F-BM for multiple entries. Because the BIER forwarding method first determines a path to destinations with lower numbered bits in the F-BM, a path to destinations corresponding to higher numbered bits will depend on whether the packet is also going to destinations with lower numbered bits, as well as on which hash value is used.

Systems and/or methods, described herein, may extend the BIER forwarding method to ensure that a path taken to any particular destination depends on the particular destination, and a hash value used to select ECMP packets for the particular flow of packets to the particular destination. In some implementations, the systems and/or methods may utilize multiple BIFTs, and each BIFT may include a single possible next hop for any one destination. In some implementations, the systems and/or methods may combine the multiple BIFTs into a single BIFT. The systems and/or methods may minimize unnecessary early divergence of paths, thereby making more efficient use of network resources. The systems and/or methods may make the BIER forwarding method deterministic, which may simplify network OAM and allow more stable performance of the network. The systems and/or methods may improve network efficiency in terms of how multicast traffic is spread across ECMP and/or LAGs. The single BIFT may require less storage space than the multiple BIFTs, and the single BIFT may be easier to create than multiple BIFTs. In some implementations, one or more entries of the single BIFT may be condensed and require less storage space.

Figure 1:
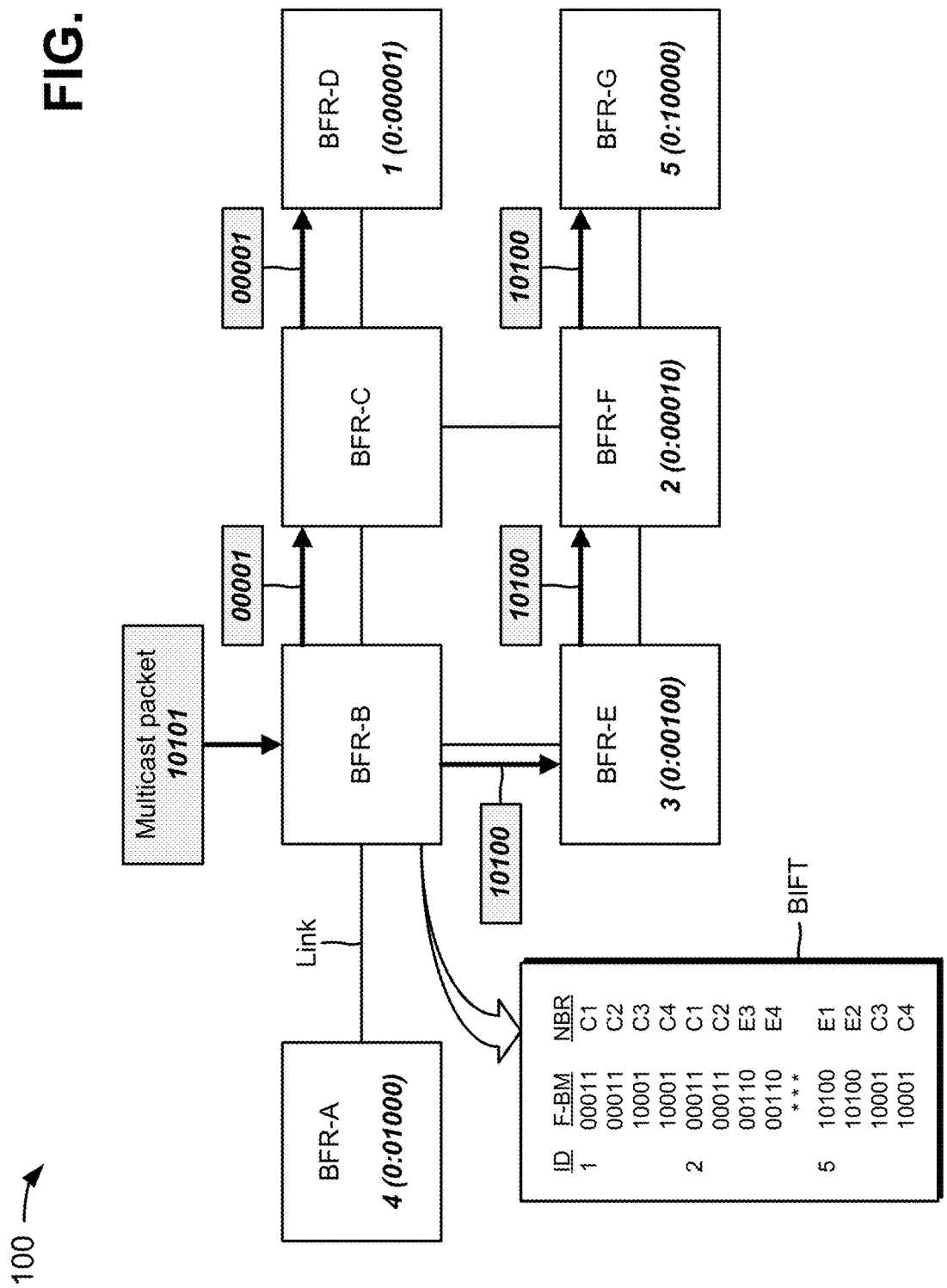
FIG. 1 is a diagram of an overview of an example implementation described herein.

FIG. 1 is a diagram of an overview of an example implementation 100 described herein. As shown in FIG. 1, a multicast domain may include multiple network devices, such as bit-forwarding routers BFR-A, BFR-B, BFR-C, BFR-D, BFR-E, BFR-F, and BFR-G, interconnected by links. Each BFR in the multicast domain may be assigned a unique BFR identifier (BFR-id). Assume that BFR-D includes a BFR-id of one (1), a set identifier (SI) of zero (0), and a bit string of "00001" (e.g., where "0:00001" identifies the SI and the bit string of BFR-D). The SI and the bit string may be used to identify a set of egress BFRs (BFERs) to which a packet is to be delivered. Assume that BFR-F includes a BFR-id of two (2), a SI of zero (0), and a bit string of "00010" (e.g., where "0:00010" identifies the SI and the bit string of BFR-F). Assume that BFR-E includes a BFR-id of three (3), a SI of zero (0), and a bit string of "00100" (e.g., where "0:00100" identifies the SI and the bit string of BFR-E). Assume that BFR-A includes a BFR-id of four (4), a SI of zero (0), and a bit string of "01000" (e.g., where "0:01000" identifies the SI and the bit string of BFR-A).

Assume that BFR-G includes a BFR-id of five (5), a SI of zero (0), and a bit string of "10000" (e.g., where "0:10000" identifies the SI and the bit string of BFR-G). Thus, placement of "1s" in a bit string (e.g., from right to left) may provide a mapping to a BFR-id associated with a BFR. For example, a bit string of "00001" may correspond to BFR-id "1" (e.g., BFR-D); a bit string of "00010" may correspond to BFR-id "2" (e.g., BFR-F); a bit string of "00100" may correspond to BFR-id "3" (e.g., BFR-E); a bit string of "01000" may correspond to BFR-id "4" (e.g., BFR-A); and a bit string of "10000" may correspond to BFR-id "5" (e.g., BFR-G).

Each BFR may utilize a single BIFT that includes four possible next hops for any one destination. For example, as shown in FIG. 1, BFR-B (e.g., an ingress BFR) may utilize a single BIFT, that is programmed into the data plane, for forwarding packets. The BIFT may include a column for BFR-ids (e.g., "1," "2," "3," "4," and "5"), a column for forwarding-bit masks (F-BMs), and a column for neighbor BFRs (BFR-NBRs). Neighbor BFRs of a particular BFR may include BFRs that are adjacent to and connected by a direct link to the particular BFR. The F-BM may include a bit mask that corresponds to a combination of the SI and the BFR-NBR. In some implementations, BFR-B may populate the BIFT by first populating the BIFT for possible next hops for a destination using bit "1" in the bit mask, then populating the BIFT for the possible next hops for the destination using bit "2" in the bit mask, and so on. As the BIFT is populated, BFR-B may count a number of times that each next hop occurs in each BIFT.

As further shown in FIG. 1, assume that a multicast packet arrives at BFR-B and includes a packet header with a bit string of "10101." The "00001" portion of the bit string in the packet header may indicate that the multicast packet is to be delivered to a BFR with a BFR-id of "1" (e.g., BFR-D); the "00100" portion of the bit string may indicate that the multicast packet is to be delivered to a BFR with a BFR-id of "3" (e.g., BFR-E); and the "10000" portion of the bit string may indicate that the multicast packet is to be delivered to a BFR with a BFR-id of "5" (e.g., BFR-G). BFR-B may perform a hash of the multicast packet to determine which line of the entries of the BIFT to use for forwarding the packet. For example, BFR-B may determine, based on the hash of the multicast packet, that the fourth line of the entries of the BIFT will be used to forward the multicast packet. The fourth line of the entries of the BIFT may indicate that BFR-B is to send one copy of the multicast packet (e.g., with a bit string of "00001") to BFR-C, and another copy of the multicast packet (e.g., with a bit string of "10100") to BFR-E. The bit string of "00001" may indicate that the copy of the multicast packet is to be delivered to the BFR with a BFR-id of "1" (e.g., BFR-D). The bit string of "10100" may indicate that the other copy of the multicast packet is to be delivered to the BFRs with BFR-ids of "3" and "5" (e.g., BFR-E and BFR-G). As further shown in FIG. 1, the multicast packet may be forwarded to BFR-D, BFR-E, and BFR-G in accordance with the instructions provided by BFR-B.

Systems and/or methods, described herein, may extend the BIER forwarding method to ensure that a path taken to any particular destination depends on the particular destination, and a hash value used to select ECMP packets for the particular flow of packets to the particular destination.

Figure 2:
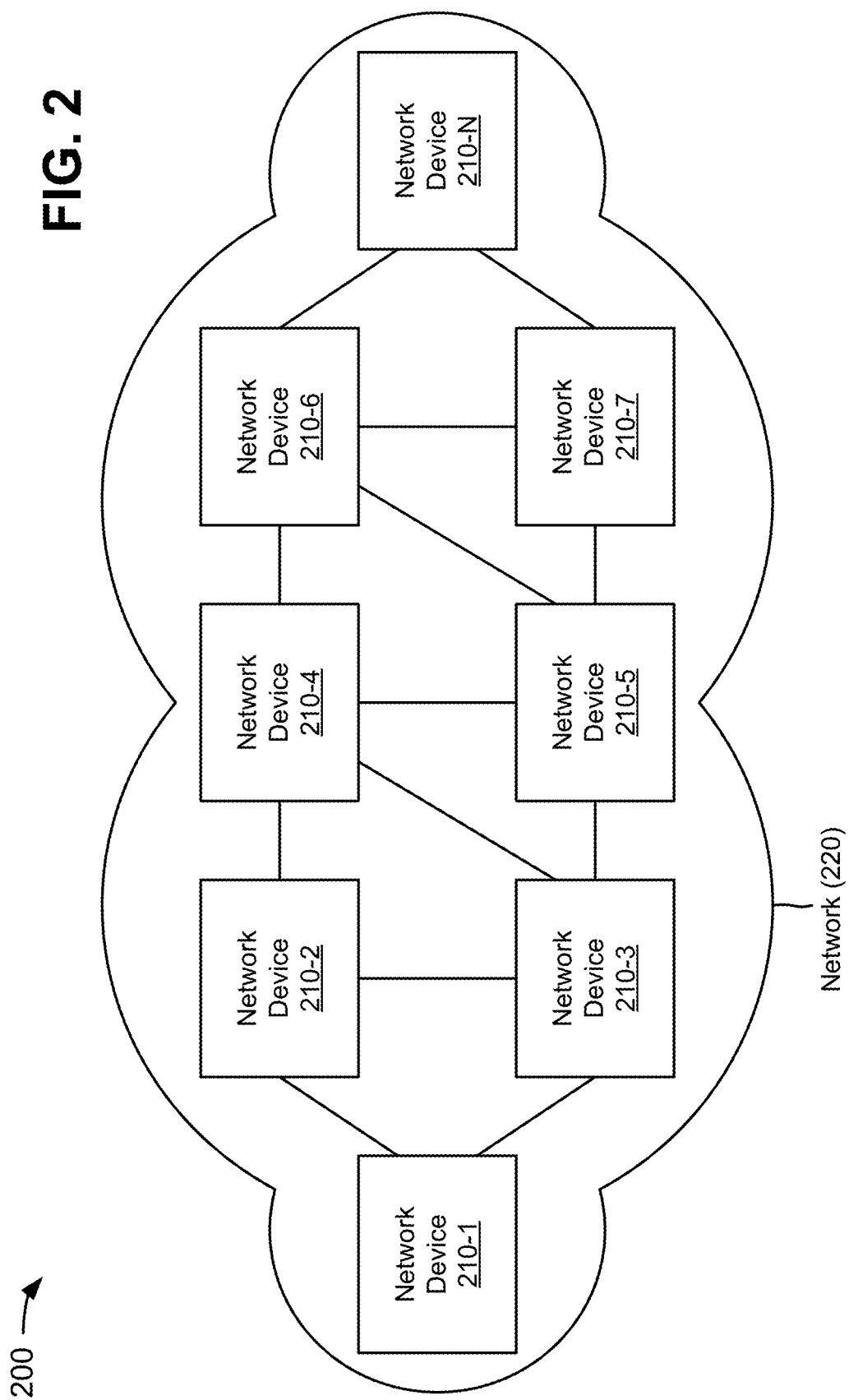
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-N (N≥1) (hereinafter referred to collectively as network devices 210, and individually as network device 210) and a network 220. Devices of environment 200 may interconnect via wired connections, wireless connections, or a combination of wired and wireless connections.

Network device 210 may include a device capable of receiving, transmitting, processing, routing, or the like, packets travelling via network 220. For example, network device 210 may include a router, a switch, a gateway, a modem, a firewall, a network interface controller (NIC), a hub, a bridge, an optical add-drop multiplexer (OADM), or another type of network device. In some implementations, network device 210 may include one or more input ports associated with receiving packets and one or more output ports associated with transmitting packets. In some implementations, network device 210 may be connected to one or more other network devices 210. In some implementations, network device 210 may communicate with other devices (not shown) in order to process and/or route packets received by network device 210. Although implementations are described herein in connection with BFRs as network devices 210, the systems and/or methods, described herein, may be utilized with other types of network devices 210 (e.g., other than BFRs).

Network 220 may include one or more wired and/or wireless networks that include network devices 210 and/or allow network devices 210 to communicate. For example, network 220 may include a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
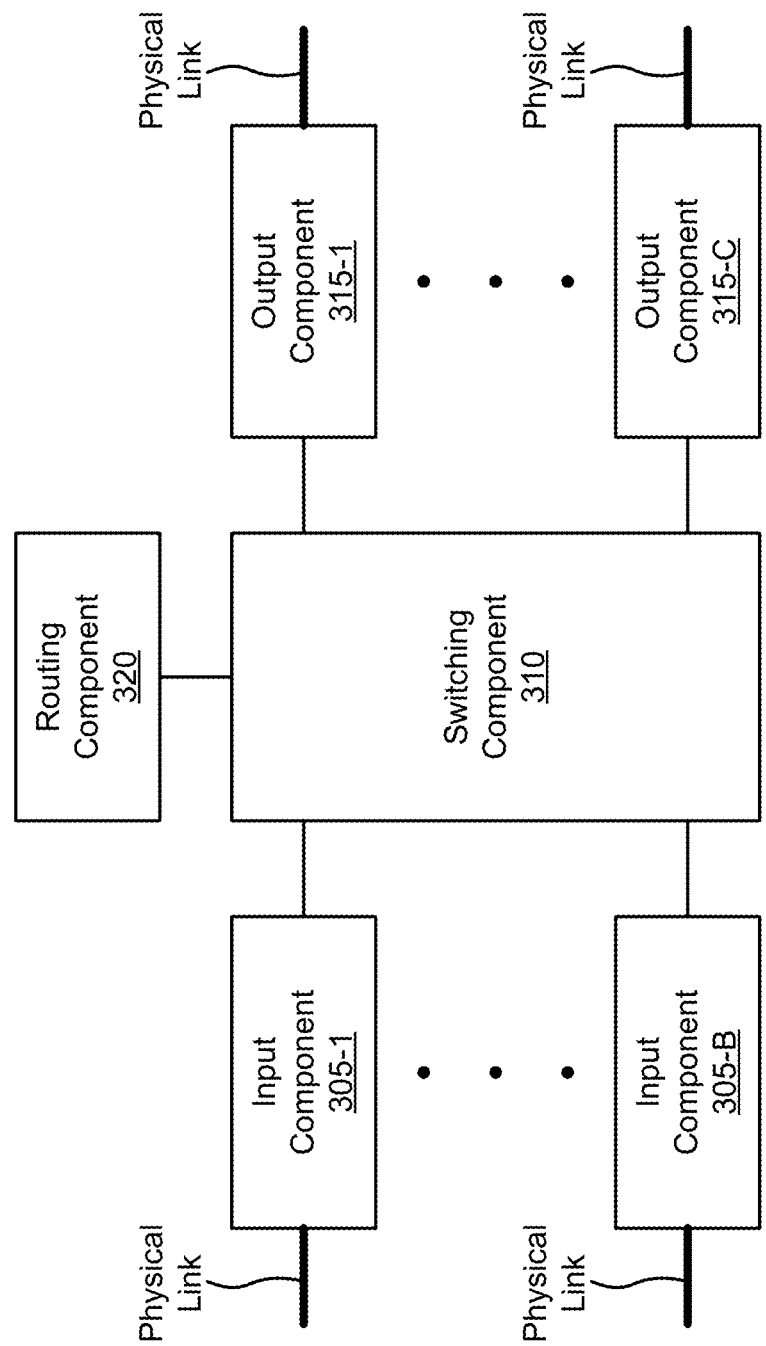
FIG. 3 is a diagram of example components of a network device of FIG. 2.

FIG. 3 is a diagram of example components of a network device 210. As shown in FIG. 3, network device 210 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a routing component 320.

Input component 305 may be a point of attachment for a physical link and may be a point of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, network device 210 may include one or more input components 305.

Switching component 310 may interconnect input components 305 with output components 315. In some implementations, switching component 310 may be implemented via one or more crossbars, via one or more busses, and/or with one or more shared memories. The shared memories may act as temporary buffers to store packets from input components 305 before the packets are eventually scheduled for delivery to output components 315. In some implementations, switching component 310 may enable input components 305, output components 315, and/or routing component 320 to communicate.

Output component 315 may be a point of attachment for a physical link and may be a point of exit for outgoing traffic, such as packets. Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, network device 210 may include one or more output components 315. In some implementations, input component 305 and output component 315 may be implemented by the same set of components (e.g., an input/output component may be a combination of input component 305 and output component 315).

Routing component 320 may include one or more processors, microprocessors, application-specific integrated circuits (ASICs), field programmable gate arrays (FPGAs), or similar types of processing components. In some implementations, routing component 320 may include a random access memory (RAM), a read only memory (ROM), and/or another type of dynamic or static storage device (e.g., a flash memory, a magnetic memory, an optical memory, etc.) that stores information and/or instructions. In some implementations, routing component 320 may communicate with other devices, networks, and/or systems connected to network device 210 to exchange information regarding network topology. Routing component 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

The number and arrangement of components shown in FIG. 3 are provided as an example. In practice, network device 210 may include additional components, fewer components, different components, or differently arranged components than those shown in FIG. 3. Additionally, or alternatively, a set of components (e.g., one or more components) of network device 210 may perform one or more functions described as being performed by another set of components of network device 210.

FIG. 4 is a flow chart of an example process 400 for combining multiple bit index forwarding tables (BIFTs) in a network device. In some implementations, one or more process blocks of FIG. 4 may be performed by network device 210. In some implementations, one or more process blocks of FIG. 4 may be performed by another device or a group of devices separate from or including network device 210.

As shown in FIG. 4, process 400 may include creating a determined number of bit index forwarding tables (BIFTs) (block 410). For example, a multicast domain may include multiple network devices 210, such as multiple BFRs. In some implementations, each BFR may utilize multiple BIFTs, and each BIFT may include a single possible next hop for any one destination. In some implementations, a particular BFR (e.g., an ingress BFR), of the multiple BFRs, may determine a number of BIFTs to create based on how many next hops are to be supported for any particular destination and/or how much memory is available to the particular BFR. In some implementations, the particular BFR may create the determined number of BIFTs in memory associated with the particular BFR.

As further shown in FIG. 4, process 400 may include determining, for each BIFT, next hops for a first set of destinations (block 420). For example, the particular BFR may determine, for each of the multiple BIFTs, next hops for a first set of destinations (e.g., lower numbered destinations). In some implementations, the particular BFR may try to distribute possible next hops for any particular destination across the BIFTs in such a way as to maximize overlap. For example, where two destinations have the same next hop, the particular BFR may attempt to assign such next hops to the same BIFT, while attempting to follow a computed distribution of next hops. In some implementations, for each of the multiple BIFTs, the particular BFR may first determine which next hops to use for the lower numbered destinations (e.g., based on the BFR-ids, such as BFR-ids "1," "2," "3," etc.). For example, assuming there are five destinations (e.g., BFR-ids "1," "2," "3," "4," and "5"), the particular BFR may determine, for each BIFT, the next hops to use for BFR-ids "1" and "2." The particular BFR may determine, for each BIFT, the ECMP next hops to use for BFR-ids "3," "4," and "5," as described below in connection with block 430. In some implementations, the particular BFR may determine a particular amount of lower numbered destinations to utilize based on the number of next hops and/or ECMP next hops associated with the multicast domain.

In some implementations, the particular BFR may first populate each BIFT for destination "1," then may populate each BIFT for destination "2," then may populate each BIFT for destination "3," and so on until the BIFTs are full. In some implementations, a first time that the particular BFR identifies a particular destination with multiple possible ECMP next hops, the particular BFR may populate each BIFT for the particular destination since previous entries would be the same in each BIFT. Such entries may correspond with the first set of destinations (e.g., the lower numbered destinations). However, a second time, and all subsequent times, that the particular BFR identifies a particular destination with multiple possible ECMP next hops, the previous entries will not all be identical in each BIFT (e.g., since there are some previous entries for which there are multiple next hops), and the particular BFR may consider what is already in each BIFT in order to determine where to put such entries, as described below in connection with block 430.

As further shown in FIG. 4, process 400 may include utilizing a technique to determine, for each BIFT, ECMP next hops for a second set of destinations (block 430). For example, the particular BFR may utilize a technique to determine, for each of the multiple BIFTs, ECMP next hops for a second set of destinations (e.g., higher numbered destinations), different than the first set of destinations. In some implementations, for each of the multiple BIFTs, the particular BFR may utilize a technique to determine which ECMP next hops to use for the higher numbered destinations (e.g., based on the BFR-ids, such as BFR-ids "5," "6," "7," etc.). For example, assuming there are five destinations (e.g., BFR-ids "1," "2," "3," "4," and "5") and that the particular BFR first determined the ECMP next hops to use for BFR-ids "1," "2," and "3," the particular BFR may utilize a technique to determine, for each BIFT, the ECMP next hop to use for BFR-ids "4" and "5." In some implementations, the particular BFR may determine a particular amount of higher numbered destinations to utilize based on the number of ECMP next hops associated with the multicast domain. In some implementations, the particular BFR may determine a particular amount of higher numbered destinations to utilize based on the particular amount of lower numbered destinations utilized by the particular BFR.

In some implementations, the particular BFR may utilize an extension to Dijkstra's algorithm as the technique to determine which ECMP next hops to use for the higher numbered destinations. Dijkstra's algorithm is a graph search algorithm that solves a single-source shortest path problem for a graph with non-negative edge path costs, and produces a shortest path tree. For example, assume that the particular BFR has utilized this technique to determine, for a destination (e.g., BFR-id "5"), that the possible ECMP next hops include a first BFR (e.g., BFR-1) and a second BFR (e.g., BFR-2). Further, assume that the particular BFR created four BIFTs. In such an example, the particular BFR may determine that traffic is to be equally split over the possible ECMP next hops, so that that two of the BIFTs use next hop BFR-1, and the other two of the BIFTs use next hop BFR-2. In some implementations, the particular BFR may determine that traffic is to be substantially equally split over the possible ECMP next hops, randomly split over the possible ECMP next hops, or the like.

The task of assigning the possible ECMP next hops across the BIFTs, while maximizing the extent to which ECMP next hops are put into BIFTs which already have the most instances of the same next hops, may be referred to as a bin-packing problem or a non-deterministic polynomial-time (NP)-hard problem. In a bin-packing problem, objects of different volumes may be packed into a finite number of bins or containers, each of a particular volume, in a way that minimizes the number of bins used. A problem "H" may be considered a NP-hard problem when every problem "L" in non-deterministic polynomial-time can be reduced in polynomial time to problem "H." However, the task of assigning the possible ECMP next hops across the BIFTs is a NP-hard problem over a relatively small number of variables. As such, the particular BFR may utilize any existing bin-packing algorithm (e.g., two-dimensional packing, linear packing, packing by weight, packing by cost, or the like) to assign the possible ECMP next hops across the BIFTs.

In some implementations, the particular BFR may utilize a heuristic method (e.g., a simpler problem, a traveling salesman problem, a search problem, or the like) to assign the possible ECMP next hops across the BIFTs, while maximizing the extent to which ECMP next hops are put into BIFTs which already have the most instances of the same next hops. For example, the particular BFR may utilize a heuristic method that first assigns the lowest numbered next hops to the BIFTs with the most existing entries with the same next hop, then assigns the next higher numbered next hops to the remaining BIFTs with the most existing entries with that next hop, and so on.

As further shown in FIG. 4, process 400 may include populating the BIFTs with information associated with the determined ECMP next hops (block 440). For example, the particular BFR may populate the multiple BIFTs with information associated with the determined ECMP next hops. In some implementations, each of the multiple BIFTs may include a column for BFR-ids (e.g., "1," "2," "3," "4," or the like), a column for forwarding-bit masks (F-BMs), and a column for neighbor BFRs (BFR-NBRs). Neighbor BFRs of a particular BFR may include BFRs that are adjacent to the particular BFR. The F-BM may include a bit mask that corresponds to a combination of the SI and the BFR-NBR. In some implementations, the particular BFR may populate the columns of each of the multiple BIFTs with information associated with the determined ECMP next hops. In some implementations, each of the multiple BIFTs may include a single possible next hop for any one destination.

As further shown in FIG. 4, process 400 may include combining the BIFTS into a single BIFT with multiple ECMP next hops for any one destination (block 450). For example, the particular BFR may combine the BIFTs into a single BIFT with multiple ECMP next hops for any one destination. In some implementations, the particular BFR may support a number (M) of ECMP branches for BIER forwarding, and may utilize a single BIFT with multiple entries, where each entry may include a next hop of M ECMP branches. In some implementations, if the particular BFR has one path to follow, a BIFT entry corresponding to the path may include a next hop of M ECMP branches, and each branch may include the same or different F-BM.

For example, assume that M=4 and that a multicast domain includes multiple network devices, such as BFR-A, BFR-B, BFR-C, BFR-D, BFR-E, and BFR-F, interconnected by links. Further, assume that BFR-D includes a BFR-id of one (1), a SI of zero (0), and a bit string of "00001" (e.g., where "0:00001" identifies the SI and the bit string of BFR-D); BFR-F includes a BFR-id of two (2), a SI of zero (0), and a bit string of "00010" (e.g., where "0:00010" identifies the SI and the bit string of BFR-F); BFR-E includes a BFR-id of three (3), a SI of zero (0), and a bit string of "00100" (e.g., where "0:00100" identifies the SI and the bit string of BFR-E); and BFR-A includes a BFR-id of four (4), a SI of zero (0), and a bit string of "01000" (e.g., where "0:01000" identifies the SI and the bit string of BFR-A). In such an example, the single BIFT for the particular BFR (e.g., BFR-B) may include the following entries before a link between BFR-E and BFR-F becomes available.

| BFR-id | F-BM | BFR-NBR |
|---|---|---|
| 1 | 0011 | C1 |
| (BFR-D) | 0011 | C2 |
|  | 0011 | C3 |
|  | 0011 | C4 |
| 2 | 0011 | C1 |
| (BFR-F) | 0011 | C2 |
|  | 0011 | C3 |
|  | 0011 | C4 |
| 3 | 0100 | E1 |
| (BFR-E) | 0100 | E2 |
|  | 0100 | E3 |
|  | 0100 | E4 |

-continued

| BFR-id | F-BM | BFR-NBR |
|---|---|---|
| 4 | 1000 | A1 |
| (BFR-A) | 1000 | A2 |
|  | 1000 | A3 |
|  | 1000 | A4 |

In this example, the numbers after the BFR-NBR letters may identify a particular ECMP branch. The F-BMs associated with each BFR-id may be the same initially since each BFR may only have a single path to reach a neighbor BFR. Furthermore, the F-BMs and BFR-NBRs may be the same for BFR-id "1" (BFR-D) and BFR-id "2" (BFR-F). When the link between BFR-E and BFR-F becomes available, a route to BFR-F may include two ECMP paths, a first ECMP path via BFR-E and a second ECMP path via BFR-C. The particular BFR (e.g., BFR-B) may determine how the two ECMP paths are utilized for the four-branch ECMP next hops of BFR-id "2" (BFR-F) of the BIFT.

In some implementations, the particular BFR may utilize heuristics, such as, for example, a simpler problem heuristic, a heuristic search hypothesis, or the like, for this determination. Assume that the first two branches of BFR-id "2" remain C1 and C2, and that the last two branches change to E3 and E4. The particular BFR may not change the BIFT for the first two branches, C1 and C2. However, since the third branch was originally C3 and is changed to E3, the particular BFR may turn off (e.g., make zero) the bit associated with BFR-F in C3 of BFR-id "2" since the particular BFR will not use BFR-C to reach BFR-F for the third branch. Because the third branch C3 is also used for BFR-id "1" (BFR-D), the particular BFR may also turn off (e.g., make zero) the bit associated with BFR-F in C3 of BFR-id "1." Since BFR-E is to be used for the third branch of BFR-id "2," the particular BFR may turn on (e.g., make one) the bit associated with BFR-F in E3 of BFR-id "2". Because the third branch E3 is also used for BFR-id "3" (BFR-E), the particular BFR may also turn on the bit associated with BFR-F in E3 of BFR-id "3."

The particular BFR may perform the same procedure for the fourth branch (e.g., C4 and E4), and the modified BIFT may include the following entries (where bold and italics indicate information that was modified).

| BFR-id | F-BM | BFR-NBR |
|---|---|---|
| 1 | 0011 | C1 |
| (BFR-D) | 0011 | C2 |
|  | 00*0*1 | C3 |
|  | 00*0*1 | C4 |
| 2 | 0011 | C1 |
| (BFR-F) | 0011 | C2 |
|  | 0*1*1*0* | *E3* |
|  | 0*1*1*0* | *E4* |
| 3 | 0100 | E1 |
| (BFR-E) | 0100 | E2 |
|  | 01*1*0 | E3 |
|  | 01*1*0 | E4 |
| 4 | 1000 | A1 |
| (BFR-A) | 1000 | A2 |
|  | 1000 | A3 |
|  | 1000 | A4 |

Now assume that the link between BFR-E- and BFR-F becomes unavailable again, and that a route to BFR-F includes a single ECMP path via BFR-C. In this example, the particular BFR (BFR-B) may modify the third and fourth branches for BFR-id "2" of the BIFT by turning off the bits associated with BFR-F in E3 and E4 and turning on the bits associated with BFR-F in C3 and C4. After these changes, the BIFT may return to its original form. In some implementations, when a particular BIFT entry needs to be modified (e.g., due to a unicast routing change), and for each branch that needs to be modified, the particular BFR may turn off a corresponding bit in the F-BM of an original branch, and turn on a bit in the F-BM of a new branch.

In some implementations, the particular BFR may create the single BIFT directly, without first creating the multiple BIFTs. For example, instead of creating the multiple BIFTs and combining the multiple BIFTs into the single BIFT, the particular BFR may utilize one or more of the techniques described above in connection with blocks 420-450 to create the single BIFT.

As further shown in FIG. 4, process 400 may include storing the single BIFT (block 460). For example, the particular BFR may store the single BIFT in a memory associated with the particular BFR (e.g., a memory provided in routing component 320, FIG. 3). In some implementations, the particular BFR may store a single BIFT as large as necessary depending on how much memory is available to the particular BFR. In some implementations, the particular BFR may program the single BIFT into the data plane, and may use the single BIFT to forward packets.

In some implementations, assume that the particular BFR creates eight BIFTs, and that the particular BFR has possible next hops K, L, and M. Further, assume that for one destination D1, the possible next hop is K or L, and that for a different destination D2, the possible next hop is L or M. For destination D1, assuming equal splitting of traffic across the possible next hops, the particular BFR may determine that four of the eight BIFTs are to include K as the next hop, and that the other four BIFTs are to include L as the next hop. For destination D2, the particular BFR may determine that four of the BIFTs are to include L as the next hop, and that other four BIFTs are to include M as the next hop. For destination D1, the particular BFR may populate the eight BIFTs with next hops in the following order: K, K, K, K, L, L, L, and L. For destination D2, the particular BFR may populate the eight BIFTs with next hops in the following order: L, L, L, L, M, M, M, and M. If the BIFTs are populated in this way, then no matter what a hash value is for an incoming packet, a copy of the multicast packet sent towards destination D1 and a copy of the multicast packet sent towards destination D2 may take different immediate next hops but both packets may end up on next hop L. In some implementations, for destination D2, the particular BFR may populate the eight BIFTs with next hops in the following order: M, M, M, M, L, L, L, and L. In such implementations, for any hash value that results in one of the last four next hops (e.g., next hop L) being utilized, a single copy of the multicast packet may be sent for both destinations D1 and D2, resulting in better utilization of a link between the particular BFR and next hop L.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. FIGS. 5A-5F show an example of creating a single BIFT in network device 210, such as BFR.

Figure 5A:
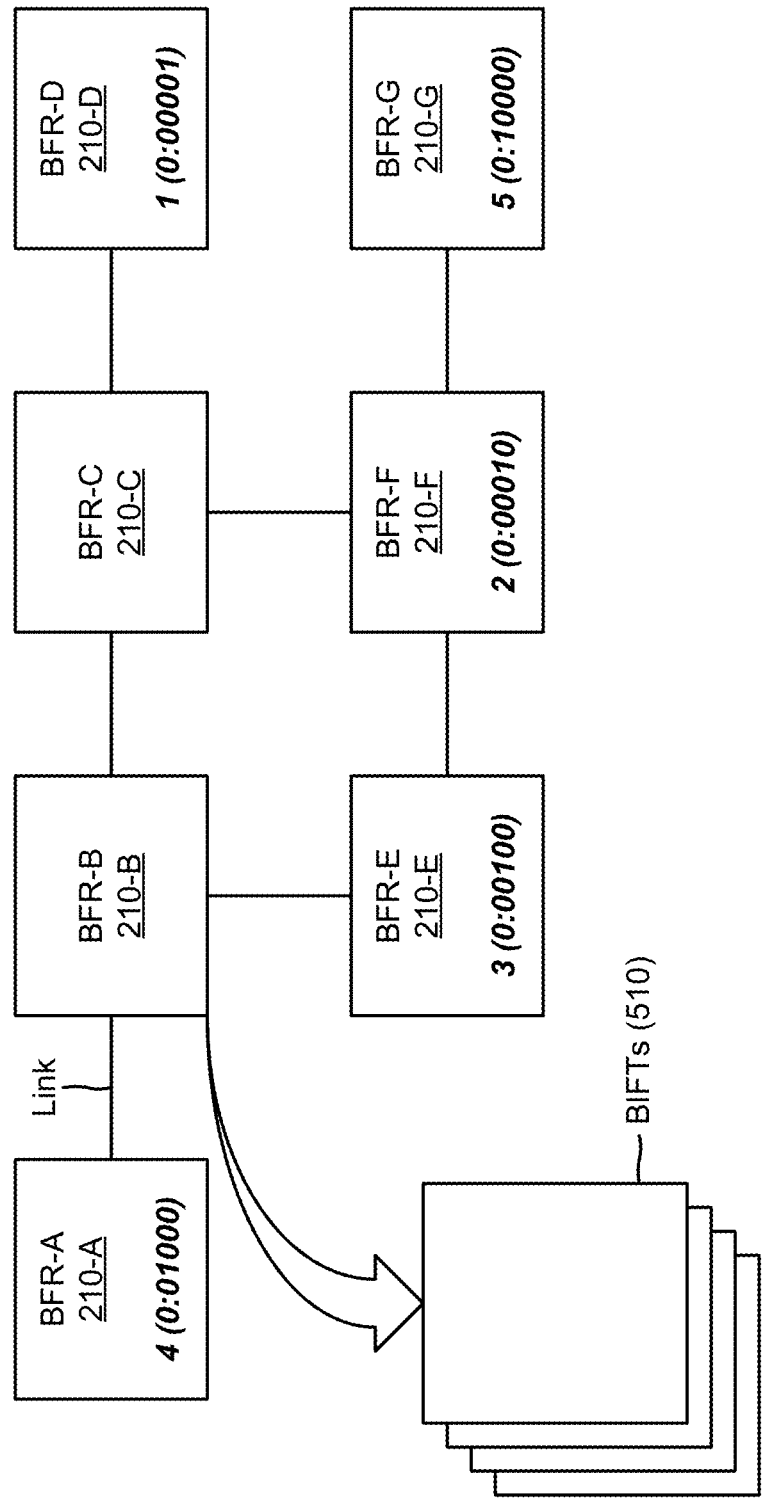

As shown in FIG. 5A, a multicast domain may include multiple network devices 210, such as BFR-A (210-A), BFR-B (210-B), BFR-C (210-C), BFR-D (210-D), BFR-E (210-E), BFR-F (210-F), and BFR-G (210-G), interconnected by links. Each BFR 210 in the multicast domain may be assigned a unique BFR-id. Assume that BFR-D includes a BFR-id of one (1), a SI of zero (0), and a bit string of "00001;" BFR-F includes a BFR-id of two (2), a SI of zero (0), and a bit string of "00010;" BFR-E includes a BFR-id of three (3), a SI of zero (0), and a bit string of "00100;" BFR-A includes a BFR-id of four (4), a SI of zero (0), and a bit string of "01000;" and BFR-G includes a BFR-id of five (5), a SI of zero (0), and a bit string of "10000." Although such information is not shown for BFR-B and BFR-C in FIG. 5A, BFR-B and BFR-C may also be associated with BFR-ids, SIs, and/or bit strings. If the BIER forwarding method is utilized for the multicast domain of FIG. 5A, BFR-B may generate a single BIFT with the following information:

| BFR-id (SI:BitString) | Forwarding Bit Mask (F-BM) | BFR Neighbor (BFR-NBR) |
| --- | --- | --- |
| 1 (0:00001) | 10011 | C |
| 2 (0:00010) | 10011 | C |
|  | 10110 | E |
| 3 (0:00100) | 10110 | E |
| 4 (0:01000) | 01000 | A |
| 5 (0:10000) | 10011 | C |
|  | 10110 | E |

Unlike the BIER forwarding method, in some implementations, each BFR 210 may utilize multiple BIFTs 510, and each BIFT 510 may include a single possible next hop for any one destination. For example, BFR-B may utilize four BIFTs 510-1, 510-2, 510-3, and 510-4, with no ECMP support, as shown in FIG. 5B. A hash performed on a packet may determine which of the four BIFTs 510 are used by BFR-B. A first BIFT 510-1 may assume that packets destined for BFR-id "2" (e.g., BFR-F) are transmitted via BFR-C, and that packets destined for BFR-id "5" (e.g., BFR-G) are transmitted via BFR-E. A second BIFT 510-2 may assume that packets destined for BFR-id "2" (e.g., BFR-F) are transmitted via BFR-C, and that packets destined for BFR-id "5" (e.g., BFR-G) are transmitted via BFR-E. A third BIFT 510-3 may assume that packets destined for BFR-id "2" (e.g., BFR-F) are transmitted via BFR-E, and that packets destined for BFR-id "5" (e.g., BFR-G) are transmitted via BFR-C. A fourth BIFT 510-4 may assume that packets destined for BFR-id "2" (e.g., BFR-F) are transmitted via BFR-E, and that packets destined for BFR-id "5" (e.g., BFR-G) are transmitted via BFR-C.

In some implementations, BFR-B may attempt to distribute the possible next hops for any particular destination across BIFTs 510 in such a way as to maximize overlap. For example, if two destinations have the same next hop, BFR-B may put those next hops in the same BIFT 510, as much as possible, while maintaining a computed distribution of next hops. As shown in FIG. 5C, BFR-B may create the four BIFTs 510-1, 510-2, 510-3, and 510-4, and may populate a first column, for each of the four BIFTs 510, with BFR-ids "1," "2," "3," "4," and "5."

In some implementations, BFR-B may populate the four BIFTs 510 with information for destination "1" (e.g., BFR-id "1"). However, since there is only one possible next hop for destination "1" (e.g., BFR-C), BFR-B may populate the four BIFTs 510 with the same information such that a first entry in each BIFT 510 may include the following information:

| BFR-id (SI:BitString) | Forwarding Bit Mask (F-BM) | BFR Neighbor (BFR-NBR) |
| --- | --- | --- |
| 1 (0:00001) | 00001 | C |

BFR-B may then populate the four BIFTs 510 with information for destination "2" (e.g., BFR-id "2"). Since there are two possible next hops, BFR-C and BFR-E, for destination "2," BFR-B may determine that two of the BIFTs 510 are to be populated with BFR-C as the next hop, and the other two BIFTs 510 are to be populated with BFR-E as the next hop. BFR-B may determine which of the four BIFTs 510 have more next hops of BFR-C, and which of the four BIFTs 510 have more next hops of BFR-E.

However, at this point, each BIFT 510 may include the same previously added next hops, and it would not matter which two BIFTs 510 tables have BFR-C added as the next hop and which two BIFTs 510 have BFR-E added as the next hop. Assume that BFR-B selects BIFTs 510-1 and 510-2 for the next hop of BFR-C, and notes that BFR-C is the same as the next hop for the entries already in BIFTs 510-1 and 510-2. Therefore, BFR-B may update the F-BM for the entries already in BIFTs 510-1 and 510-2. This will create BIFTs 510-1 and 510-2 that include the following information:

| BFR-id (SI:BitString) | Forwarding Bit Mask (F-BM) | BFR Neighbor (BFR-NBR) |
| --- | --- | --- |
| 1 (0:00001) | 00011 | C |
| 2 (0:00010) | 00011 | C |

Further, assume that BFR-B selects BIFTs 510-3 and 510-4 for the next hop of BFR-E, and notes that BFR-E is a different next hop from the entries already in BIFTs 510-3 and 510-4. Therefore, the F-BM for the previously added entries (e.g., for destination "1") may remain the same, and will create BIFTs 510-3 and 510-4 that include the following information:

| BFR-id (SI:BitString) | Forwarding Bit Mask (F-BM) | BFR Neighbor (BFR-NBR) |
| --- | --- | --- |
| 1 (0:00001) | 00001 | C |
| 2 (0:00010) | 00010 | E |

BFR-B may then add destination "3" (e.g., BFR-id "3") to each BIFT 510. Since there is only one best path to destination "3" (e.g., BFR-E), BIFTs 510-1 and 510-2 may be updated as follows:

| BFR-id (SI:BitString) | Forwarding Bit Mask (F-BM) | BFR Neighbor (BFR-NBR) |
| --- | --- | --- |
| 1 (0:00001) | 00011 | C |
| 2 (0:00010) | 00011 | C |
| 3 (0:00100) | 00100 | E |

Furthermore, BIFTs 510-3 and 510-4 may be updated as follows:

| BFR-id (SI:BitString) | Forwarding Bit Mask (F-BM) | BFR Neighbor (BFR-NBR) |
| --- | --- | --- |
| 1 (0:00001) | 00001 | C |
| 2 (0:00010) | 00110 | E |
| 3 (0:00100) | 00110 | E |

BFR-B may then add destination "4" (e.g., BFR-id "4") to each BIFT 510. There is only one best path to destination "4" (e.g., via BFR-A), but this time the best path to destination "4" may include a next hop that is different from the next hops for previous entries. Based on this, BIFTs 510-1 and 510-2 may be updated as follows:

| BFR-id (SI:BitString) | Forwarding Bit Mask (F-BM) | BFR Neighbor (BFR-NBR) |
| --- | --- | --- |
| 1 (0:00001) | 00011 | C |
| 2 (0:00010) | 00011 | C |
| 3 (0:00100) | 00100 | E |
| 4 (0:01000) | 01000 | A |

Furthermore, BIFTs 510-3 and 510-4 may be updated as follows:

| BFR-id (SI:BitString) | Forwarding Bit Mask (F-BM) | BFR Neighbor (BFR-NBR) |
| --- | --- | --- |
| 1: (0:00001) | 00001 | C |
| 2: (0:00010) | 00110 | E |
| 3: (0:00100) | 00110 | E |
| 4: (0:01000) | 01000 | A |

Figure 5D:
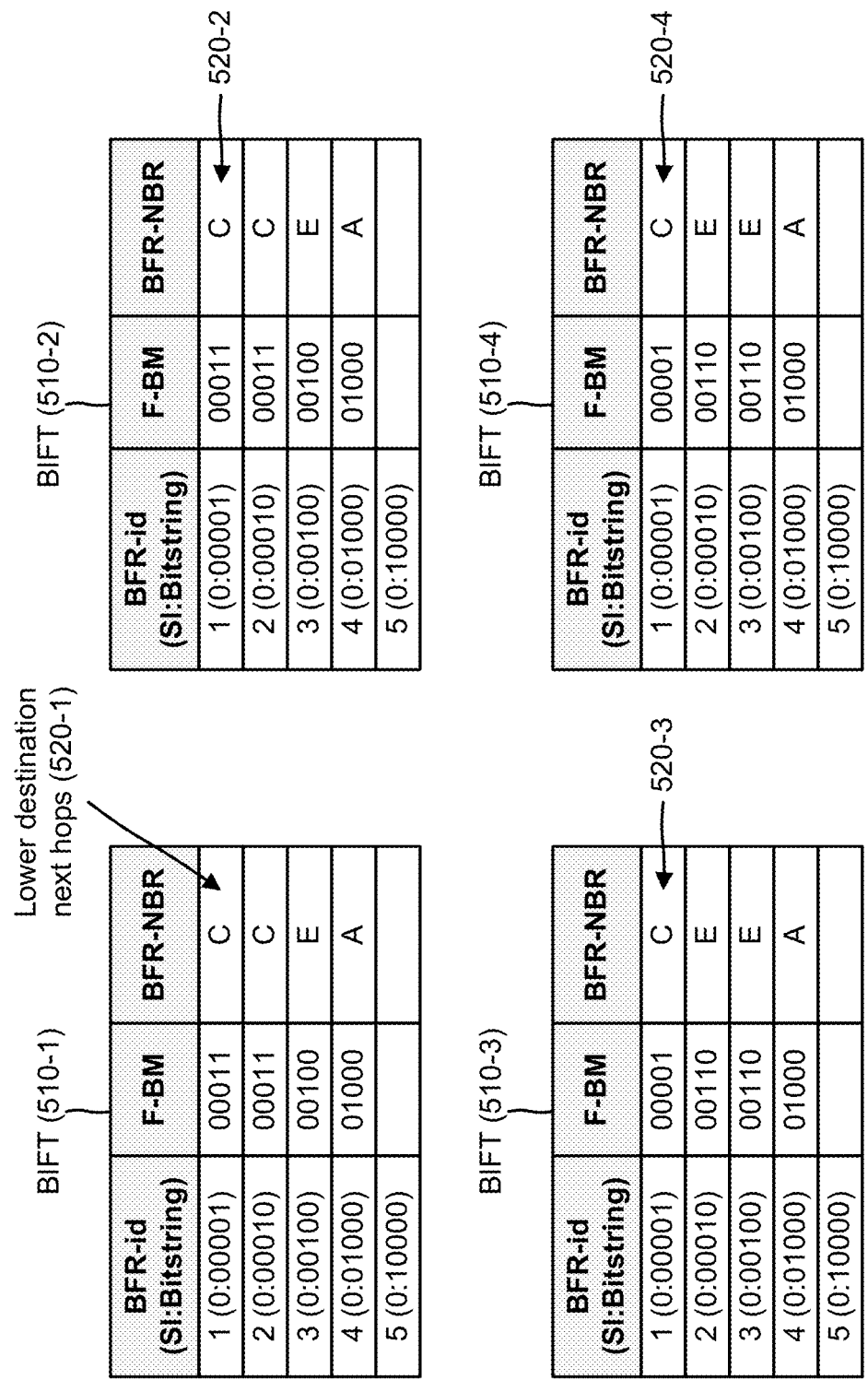

As shown in FIG. 5D, BFR-B may first determine which next hops 520 to use for the lower numbered destinations (e.g., based on the BFR-ids, such as BFR-ids "1," "2," "3," and "4"). For example, assume that BFR-B populates the F-BM column and the BFR-NBR column, of the first BIFT 510-1, with information 520-1 associated with next hops for BFR-ids "1," "2," "3," and "4" (e.g., determined by BFR-B to be lower numbered destinations based on the multicast domain). Assume that BFR-B populates the F-BM column and the BFR-NBR column, of the second BIFT 510-2, with information 520-2 associated with next hops for BFR-ids "1," "2," "3," and "4." Assume that BFR-B populates the F-BM column and the BFR-NBR column, of the third BIFT 510-3, with information 520-3 associated with next hops for BFR-ids "1," "2," "3," and "4." Assume that BFR-B populates the F-BM column and the BFR-NBR column, of the fourth BIFT 510-4, with information 520-4 associated with next hops for BFR-ids "1," "2," "3," and "4."

Finally, BFR-B may provide entries for destination "5" (e.g., BFR-id "5") to each BIFT 510. In this case, destination "5" may be associated with two possible next hops (e.g., BFR-C and BFR-E). Since there are multiple possible next hops, BFR-B may determine how many next hops of BFR-C and how many next hops of BFR-E are already in each BIFT 510. However, in this case the answer is not the same for each BIFT 510, since there is a previous destination with multiple ECMP entries resulting in different BIFTs 510 containing different information. BFR-B may optimize the forwarding by choosing BIFTs 510-1 and 510-2 for the possible next hop of BFR-C (e.g., since BIFTs 510-1 and 510-2 have more entries which have BFR-C as the next hop), and by choosing BIFTs 510-3 and 510-4 for the possible next hop of BFR-E (e.g., since BIFTs 510-3 and 510-4 have more entries which already have BFR-E as the next hop).

Figure 5E:
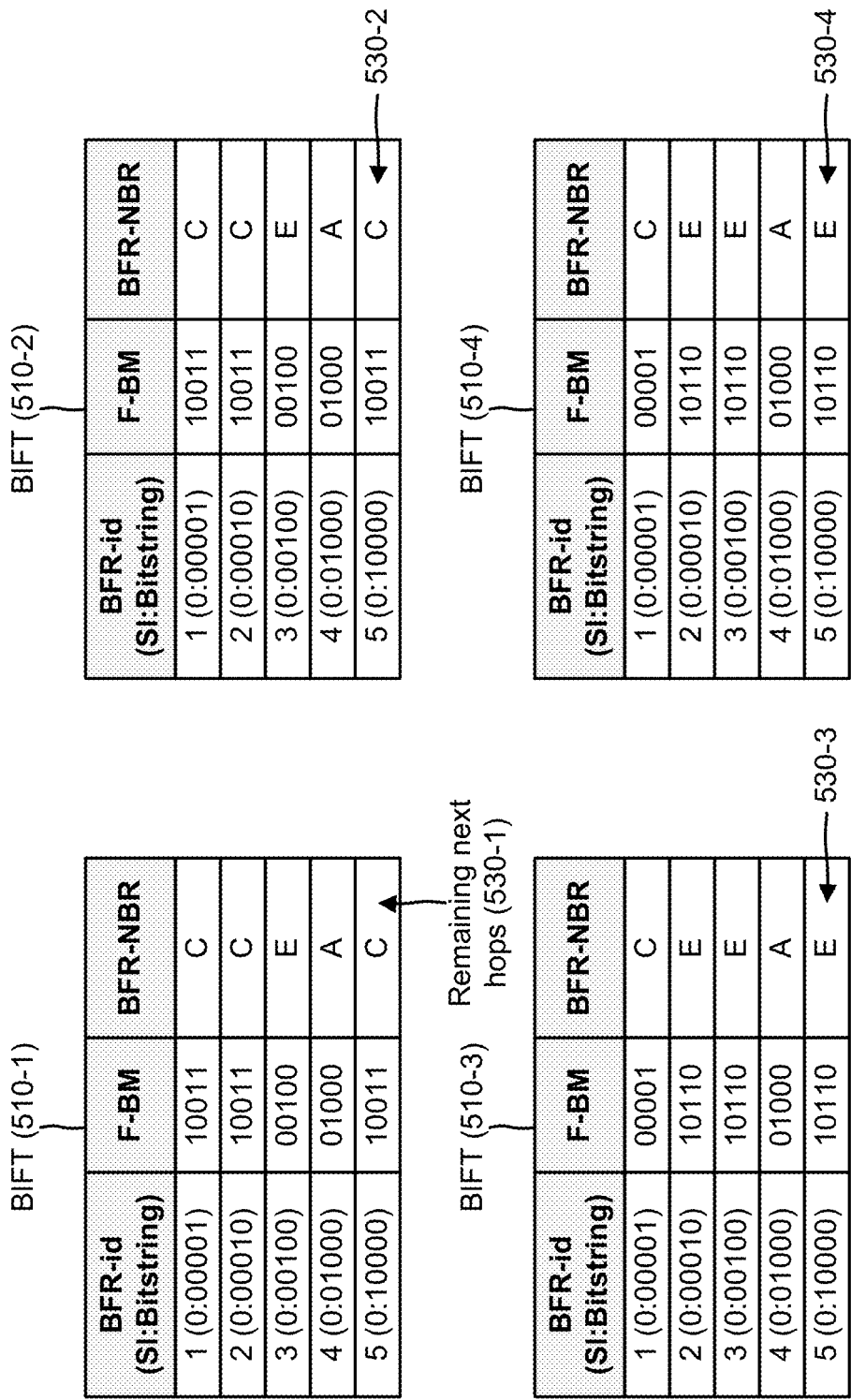

With reference to FIGS. 5D and 5E, in deciding which next hop to use for BFR-id "5" in each BIFT 510, BFR-B may utilize a ECMP routing computation (e.g., an extension to Dijkstra's algorithm) to determine that the possible ECMP next hops (e.g., for BFR-id "5") include BFR-C and BFR-E. Assuming that traffic is equally split over the possible next hops, BFR-B may determine that that two of BIFTs 510 are to use next hop BFR-C and the other two BIFTs 510 are to use next hop BFR-E. As shown in FIG. 5D, the first BIFT 510-1 includes two references to BFR-C and one reference to BFR-E; the second BIFT 510-2 includes two references to BFR-C and one reference to BFR-E; the third BIFT 510-3 includes one reference to BFR-C and two references to BFR-E; and the fourth BIFT 510-4 includes one reference to BFR-C and two references to BFR-E.

BFR-B may utilize a simple heuristic method to assign the possible next hops (e.g., two references to BFR-C and two references to BFR-E) across BIFTs 510, while maximizing the extent to which next hops are put into BIFTs 510 which already have the most instances of the same next hops. The simple heuristic method may include first assigning lower numbered next hops to BIFTs 510 with the most existing entries with the same next hop, then assigning the next higher numbered next hops to the remaining BIFTs 510 with the most existing entries with that next hop, and so on. Based on this approach, and as shown in FIG. 5E, BFR-B may associate each reference to BFR-C with destination "5" (e.g., BFR-id "5") of the first BIFT 510-1 and the second BIFT 510-2, as indicated by reference numbers 530-1 and 530-2, respectively. Furthermore, BFR-B may associate each reference to BFR-E with destination "5" (e.g., BFR-id "5") of the third BIFT 510-3 and the fourth BIFT 510-4, as indicated by reference numbers 530-3 and 530-4, respectively.

As shown in FIG. 5F, BFR-B may combine BIFTs 510 into a single BIFT 540 that includes multiple ECMP next hops 550 for any one destination (e.g., destinations "1" through "5"). As further shown, destination "2" (e.g., BFR-F) may be reached via a first path associated BFR-C, as indicated by BFR-NBRs C1 and C2, or via a second path associated with BFR-E, as indicated by BFR-NBRs E3 and E4. Destination "5" (e.g., BFR-G) may be reached via a first path associated BFR-E, as indicated by BFR-NBRs E1 and E2, or via a second path associated with BFR-C, as indicated by BFR-NBRs C3 and C4.

In some implementations, many destinations in BIFT 540 include F-BMs with different bit strings, and some destinations in BIFT 540 include F-BMs with the same bit string. For example, destination "4" (e.g., BFR-id "4") includes the same bit string (01000) for all four F-BMs. In some implementations, when a destination includes four F-BMs with the same bit string, BFR-B may store the four F-BMs separately, which may use more storage space but may simplify coding. Alternatively, BFR-B may combine the four F-BMs into a single F-BM, which may require more complex coding for storing and retrieving the F-BMs but many reduce the required storage space.

In some implementations, when forwarding a packet, BFR B may perform a hash of BIFT 540 to determine which line in BIFT 540 to use for each destination, and may forward the packet accordingly. For example, assume that the hash of BIFT 540 indicates that the third line of each destination is to be used. In such an example, BFR-B may utilize the third line for every destination (e.g., destination "1" through "5") in BIFT 540 when forwarding the packet. Such an example may be similar to using BIFT table 510-3 shown in FIG. 5B.

As indicated above, FIGS. 5A-5F are provided merely as an example. Other examples are possible and may differ from what was described with regard to FIGS. 5A-5F.

FIG. 6 is a flow chart of an example process 600 for forwarding a multicast packet based on a BIFT. In some implementations, one or more process blocks of FIG. 6 may be performed by network device 210. In some implementations, one or more process blocks of FIG. 6 may be performed by another device or a group of devices separate from or including network device 210.

As shown in FIG. 6, process 600 may include receiving a multicast packet that includes a packet header with information identifying destination addresses (block 610). For example, a multicast domain may include multiple network devices 210, such as multiple BFRs. In some implementations, each BFR may utilize multiple BIFTs, and each BIFT may include a single possible next hop for any one destination. In some implementations, each BFR may utilize a single BIFT that includes multiple possible next hops for any one destination. In some implementations, a particular BFR (e.g., an ingress BFR), of the multiple BFRs, may receive a multicast packet that includes a packet header. In some implementations, the packet header may include information identifying multiple destination addresses. For example, assume that the multicast domain includes BFRs associated with BFR-ids "1," "2," "3," "4," and "5," and that the packet header includes a bit string of "11100." Such a bit string may indicate that the multicast packet is to be delivered to BFRs associated with BFR-ids "3" (e.g., based on "00100" portion of the bit string), "4" (e.g., based on "01000" portion of the bit string), and "5" (e.g., based on "10000" portion of the bit string).

As further shown in FIG. 6, process 600 may include analyzing the packet header to determine a line of next hops of a bit index forwarding table (BIFT) to use for the multicast packet (block 620). For example, the particular BFR may analyze the packet header of the multicast packet in order to determine next hops of the single BIFT to use for the multicast packet. In some implementations, the particular BFR may perform a hash (e.g., utilizing a hash function) of the packet header in order to identify information contained in the packet header. For example, the particular BFR may perform a hash of some or all of the packet header to identify the bit string of "11100." In some implementations, the particular BFR may utilize the bit string to determine that the multicast packet is to be delivered to BFRs associated with BFR-ids "3," "4," and "5." In some implementations, the particular BFR may identify which line to utilize for each entry in the BIFT, and may utilize the identified line to deliver the multicast packet to BFRs associated with BFR-ids "3," "4," and "5." For example, the particular BFR may identify the line to utilize for each entry as the line that includes entries for forwarding a packet to BFRs associated with BFR-ids "3," "4," and "5." In some implementations, the particular BFR may utilize another transformation function, other than the hash function, in order to identify information contained in the packet header, such as a checksum, a check digit, a fingerprint, a randomization function, or the like.

In some implementations, the particular BFR may perform a hash on packets to identify a particular BIFT, of the multiple BIFTs, for the packets and to ensure that the packets that belong to a same application flow of packets take the same path, and so that the packets stay in order and have consistent treatment. However, different applications, or packets, that go between different sources and destinations, may take different paths in order to allow traffic to be spread out across multiple links in a network. For example, a protocol that runs directly over IP may include either TCP or UDP, and then an application runs over TCP or UDP. If the protocol is UDP, the particular BFR may hash on an IP source and destination address and on a UDP source and destination port (e.g., to identify the particular BIFT). If the protocol is TCP, the particular BFR may hash on the IP source and destination address and on a TCP source and destination port (e.g., to identify the particular BIFT). If the protocol is neither UDP nor TCP, the particular BFR may hash only on the IP source and destination address and the IP protocol field (e.g., to identify the particular BIFT). Where there are multiple applications within a same IP host, the multiple applications may utilize different ports. This may allow packets that are from the same source, to the same destination, and using the same application, to take the same path. Packets from different sources, to different destinations, or supporting different applications may take different paths.

Similar procedures are performed in multiprotocol label switching (MPLS) networks. In many cases, a MPLS packet may include an IP packet, and the particular BFR may hash on the IP packet that is within the MPLS packet (e.g., to identify the particular BIFT). In other cases, a MPLS packet may include other MPLS packets so that multiple MPLS headers are on the same MPLS packet. This may occur, for example, when there are multiple pseudowires between the same two provider-edge devices (e.g., each pseudowire may support a different user or a different application). The pseudowires may each have a MPLS label switched path (LSP), but multiple pseudowire LSPs may be multiplexed within a single LSP. This may imply that each packet includes two MPLS headers (e.g., a first header for a path between the two provider-edge device, and a second header for each pseudowire). Network devices (e.g., the particular BFR) in the middle of the path may forward packets based on the first MPLS header, but may perform a hash on the second headers. If there are ECMP paths through the network or if there is a LAG group between two network devices, then packets from the same pseudowire may utilize the same path, but packets from different pseudowires may be spread over multiple paths.

In some implementations, if the packet is a BIER packet, the particular BFR may not hash on a BIER bit string that identifies which destinations are to receive each packet. This may enable packets, destined for a particular destination, to always utilize the same path, without regard for which other destinations also need to receive the same packets. However, the hash function may include application information and source information. For example, if a first person is watching channel 7 on a first television, the first person may want packets for channel 7 to always take a consistent path, even if a second person keeps changing between channel 7 and channel 5. However, if the first person is watching channel 7, the first person may not care whether the packets for channel 7 take the same path as packets for a video chat that the second person is having.

As further shown in FIG. 6, process 600 may include identifying next hops for the multicast packet based on the determined line of next hops (block 630). For example, the particular BFR may identify next hops for the multicast packet based on the determined line of the BIFT. In some implementations, the particular BFR may utilize the entries of the determined line of the BIFT to identify the next hops for the multicast packet. For example, if the determined line of the BIFT includes particular entries for forwarding the multicast packet to BFRs associated with BFR-ids "3," "4," and "5," the particular BFR may identify the next hops associated with the particular entries as being the next hops for the multicast packet.

As further shown in FIG. 6, process 600 may include forwarding the multicast packet to the identified next hops for forwarding to destinations associated with the destination addresses (block 640). For example, the particular BFR may forward the multicast packet to the identified next hops, and the identified next hops may forward the multicast packet on to destinations associated with the destination addresses provided in the packet header. In some implementations, the particular BFR may forward copies of the multicast packet to different identified next hops. For example, if the determined line of the BIFT includes particular entries for forwarding the multicast packet to BFRs associated with BFR-ids "3," "4," and "5," the particular BFR may create a first copy of the multicast packet, and may include a bit string of "01000" (e.g., corresponding to BFR-id "4:) in a packet header of the first copy of the multicast packet. The particular BFR may provide the first copy of the multicast packet to a first ECMP next hop, and the first ECMP next hop may utilize the bit string of "01000" to forward the first copy of the multicast packet towards a BFR associated with BFR-id "4." The particular BFR may create a second copy of the multicast packet, and may include a bit string of "10100" (e.g., corresponding to BFR-ids "3" and "5") in a packet header of the second copy of the multicast packet. The particular BFR may provide the second copy of the multicast packet to a second ECMP next hop, and the second ECMP next hop may utilize the bit string of "10100" to forward the second copy of the multicast packet towards BFRs associated with BFR-ids "3" and "5."

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of forwarding a multicast packet based on a BIFT.

Figure 7A:
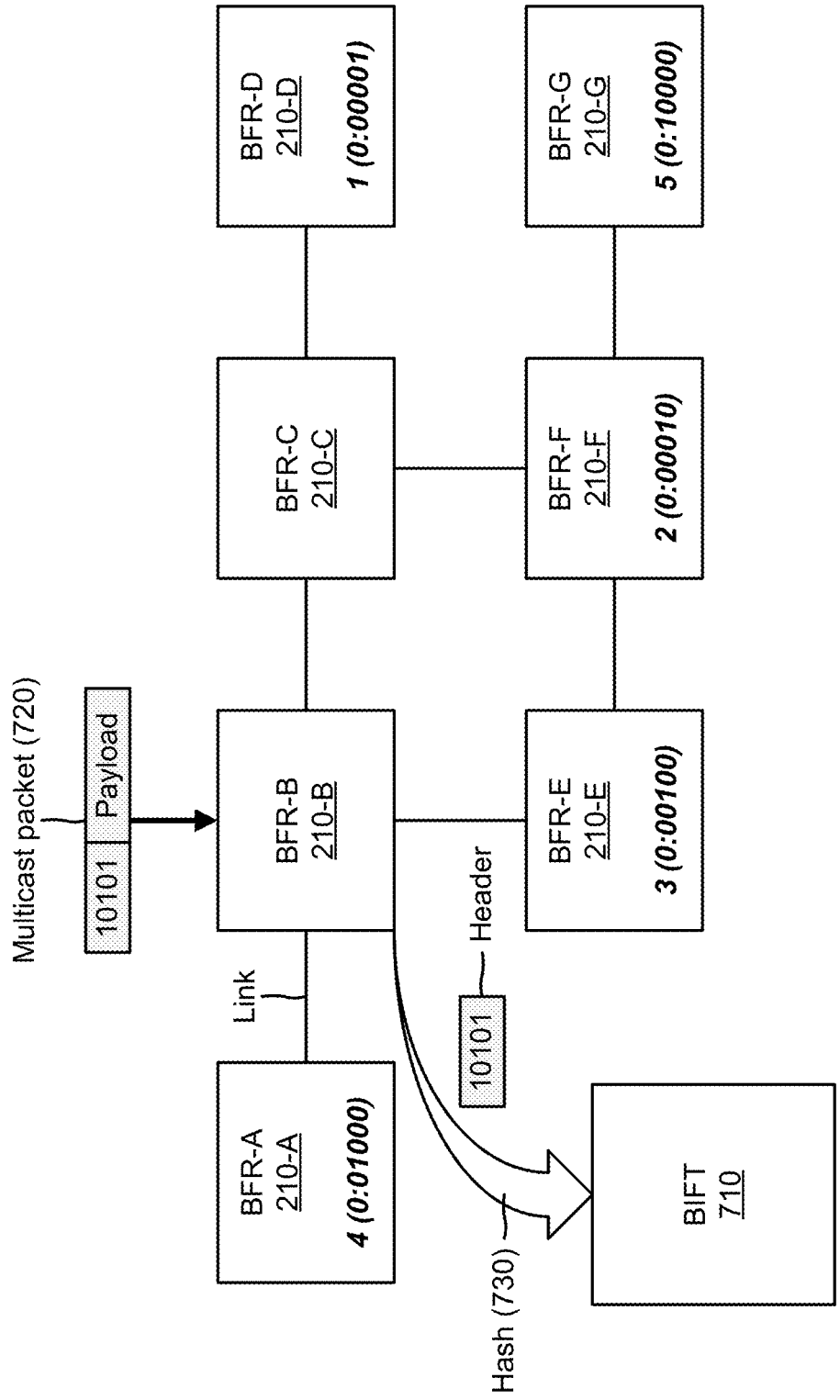

As shown in FIG. 7A, a multicast domain may include multiple network devices 210, such as BFR-A (210-A), BFR-B (210-B), BFR-C (210-C), BFR-D (210-D), BFR-E (210-E), BFR-F (210-F), and BFR-G (210-G), interconnected by links. Each BFR 210 in the multicast domain may be assigned a unique BFR-id. BFR-D may include a BFR-id of one (1), a SI of zero (0), and a bit string of "00001;" BFR-F may include a BFR-id of two (2), a SI of zero (0), and a bit string of "00010;" BFR-E may include a BFR-id of three (3), a SI of zero (0), and a bit string of "00100;" BFR-A may include a BFR-id of four (4), a SI of zero (0), and a bit string of "01000;" and BFR-G may include a BFR-id of five (5), a SI of zero (0), and a bit string of "10000." Although such information is not shown for BFR-B and BFR-C in FIG. 7A, BFR-B and BFR-C may also be associated with BFR-ids, SIs, and/or bit strings.

As further shown in FIG. 7A, each BFR 210 may utilize a single BIFT 710 that includes multiple possible next hops for any one destination. For example, each entry of BIFT 710 may include four possible next hops. As further shown, BFR-B may receive a multicast packet 720 that includes a payload and a packet header with a bit string of "10101." The bit string of "10101" may indicate that packet 720 is to be delivered to BFRs 210 with BFR-ids of "1" (e.g., BFR-D, as indicated by the "00001" portion of the bit string), "3" (e.g., BFR-E, as indicated by the "00100" portion of the bit string), and "5" (e.g., BFR-G, as indicated by the "10000" portion of the bit string). BFR-B may perform a hash of packet 720 to identify the bit string of the packet header, as indicated by reference number 730 in FIG. 7A.

As shown in FIG. 7B, BFR-B may utilize the bit string of "10101" (e.g., as identified based on the hash of packet 720) to determine a particular line of the entries of BIFT 710. For example, BFR-B may determine that a fourth line of the entries of BIFT 710 is to be utilized to forward packet 720 to BFR-D, BFR-E, BFR-G (e.g., destinations "1," "3," and "5"), as indicated by reference number 740 in FIG. 7B.

Figure 7C:
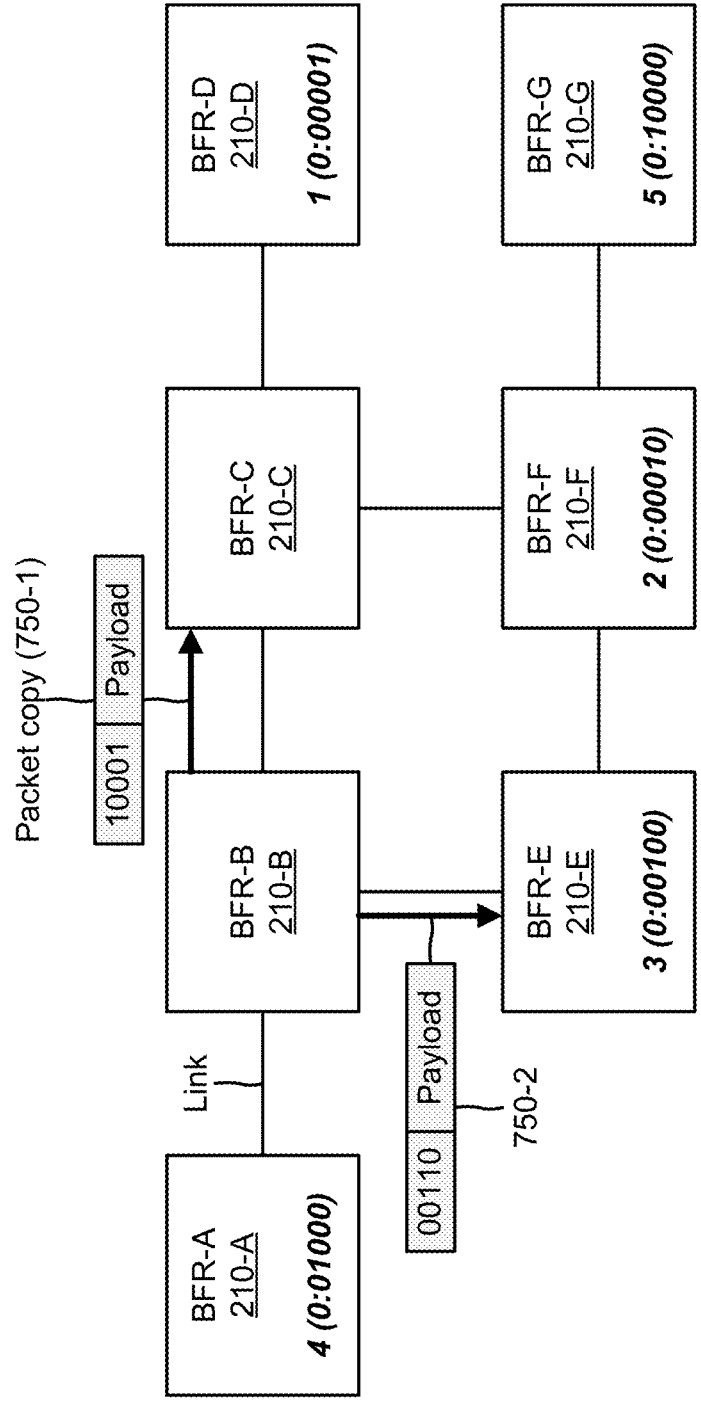

As shown in FIG. 7C, based on the fourth line of the entries of BIFT 710, BFR-B may create a first copy 750-1 of packet 720 that includes a bit string of "10001" in a packet header. BFR-B may forward first packet copy 750-1 to BFR-C, and BFR-C may receive first packet copy 750-1. Further based on the fourth line of the entries of BIFT 710, BFR-B may create a second copy 750-2 of packet 720 that includes a bit string of "00110" in a packet header. BFR-B may forward second packet copy 750-2 to BFR-E (e.g., based on the "00100" portion of the bit string), and BFR-E may receive second packet copy 750-2.

Figure 7D:
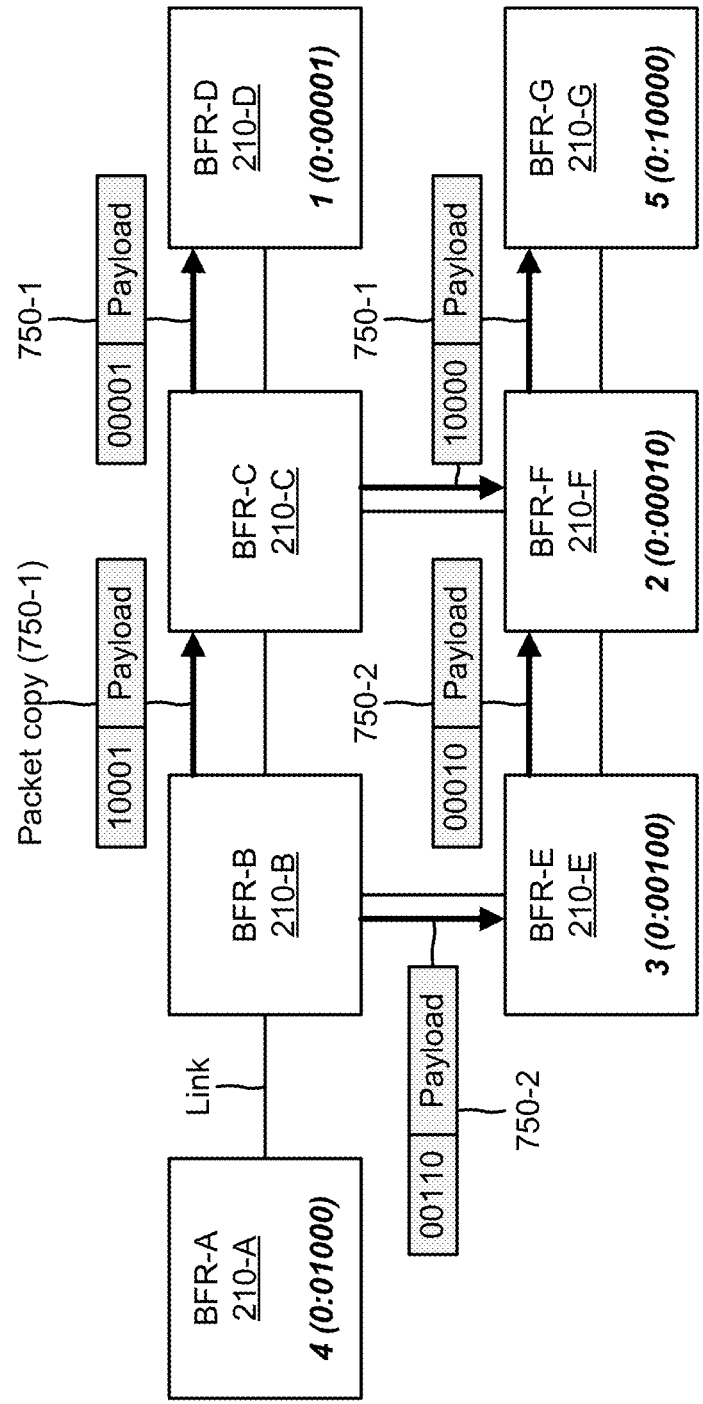

As shown in FIG. 7D, the bit string of "10001" may indicate to BFR-C that first packet copy 750-1 is to be forwarded to BFRs 210 with BFR-ids of "1" (e.g., BFR-D) and "5" (e.g., BFR-G). Therefore, BFR-C may forward first packet copy 750-1 to BFR-D, and BFR-D may receive first packet copy 750-1. BFR-C may forward first packet copy 750-1 to BFR-F, and BFR-F may forward first packet copy 750-1 to BFR-G based on the bit string "10000." BFR-G may receive first packet copy 750-1. The bit string of "00110" may indicate to BFR-E that second packet copy 750-2 is to be received by BFR-E (e.g., with a BFR-id "3," as indicated by the "00100" portion of the bit string) and forwarded to BFR 210 with a BFR-id of "2" (e.g., BFR-F, as indicated by the "00010" portion of the bit string). Therefore, BFR-E may receive second packet copy 750-2, and may forward second packet copy 750-2 to BFR-F. BFR-F may receive second packet copy 750-2.

As indicated above, FIGS. 7A-7D are provided merely as an example. Other examples are possible and may differ from what was described with regard to FIGS. 7A-7D.

Systems and/or methods, described herein, may extend the BIER forwarding method to ensure that a path taken to any particular destination depends on the particular destination, and a hash value used to select ECMP packets for the particular flow of packets to the particular destination. The systems and/or methods may utilize a single BIFT that includes a multiple possible next hops for any one destination. The systems and/or methods may minimize unnecessary early divergence of paths, thereby making more efficient use of network resources. The systems and/or methods may make the BIER forwarding method deterministic, which may simplify network OAM and allow more stable performance of the network. The systems and/or methods may improve network efficiency in terms of how multicast traffic is spread across ECMP and/or LAGs.

The foregoing disclosure provides illustration and description, but is not intended to be exhaustive or to limit the implementations to the precise form disclosed. Modifications and variations are possible in light of the above disclosure or may be acquired from practice of the implementations. For example, while the systems and/or methods, described herein, are described in the context of BFRs for simplicity, these systems and/or methods may equally apply in the context of other types of network devices.

As used herein, the term component is intended to be broadly construed as hardware, firmware, and/or a combination of hardware and software.

As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
   one or more processors to:
   create a plurality of forwarding tables,
   each of the plurality of forwarding tables including information associated with a set of destinations;
   determine, for each of the plurality of forwarding tables, next hops for the set of destinations;
   determine, for each of the plurality of forwarding tables, equal cost multipath next hops for the set of destinations;
   populate the plurality of forwarding tables with information associated with the determined next hops and the determined equal cost multipath next hops,
   a first forwarding table, of the plurality of forwarding tables, including a first entry indicating a first next hop as an equal cost multipath next hop for a particular destination of the set of destinations, and
   a second forwarding table, of the plurality of forwarding tables, including a second entry indicating a second next hop as an equal cost multipath next hop for the particular destination; and
combine the plurality of forwarding tables into a single forwarding table,
the single forwarding table being used to forward a multicast packet toward a plurality of destinations, the plurality of destinations including the particular destination, and
the single forwarding table, based on combining the plurality of forwarding tables, including a third entry indicating the first next hop and the second next hop as equal cost multipath next hops for the particular destination.

2. The network device of claim 1, where the one or more processors are further to:
store the plurality of forwarding tables and the single forwarding table; and
program the single forwarding table into a data plane used to forward multicast packets.

3. The network device of claim 1, where the single forwarding table includes a plurality of possible next hops for each destination of the set of destinations.

4. The network device of claim 1, where the single forwarding table includes a bit index forwarding table (BIFT).

5. The network device of claim 1, where the network device comprises a bit-forwarding device.

6. The network device of claim 1, where the one or more processors are further to:
receive the multicast packet that includes information identifying destination addresses for the multicast packet;
analyze the multicast packet to determine a portion of the single forwarding table to use for the multicast packet;
identify particular next hops associated with the portion of the single forwarding table and associated with the destination addresses; and
forward the multicast packet to the particular next hops,
the particular next hops forwarding the multicast packet toward destinations associated with the destination addresses.

7. The network device of claim 6, where, when analyzing the multicast packet to determine the portion of the single forwarding table to use for the multicast packet, the one or more processors are to:
apply a hash function to at least a portion of the multicast packet to determine the portion of the single forwarding table to use for the multicast packet.

8. The network device of claim 6, where the one or more processors are further to:
create a copy of the multicast packet for each of the particular next hops; and
where, when forwarding the multicast packet to the particular next hops, the one or more processors are to:
forward the copy of the multicast packet to each of the particular next hops.

9. A method, comprising:
creating, by a network device provided in a network, a plurality of forwarding tables,
each of the plurality of forwarding tables including information associated with a set of destinations;
determining, by the network device and for each of the plurality of forwarding tables, next hops for the set of destinations;
determining, by the network device and for each of the plurality of forwarding tables, equal cost multipath next hops for the set of destinations;
populating, by the network device, the plurality of forwarding tables with information associated with the determined next hops and the determined equal cost multipath next hops,
a first forwarding table, of the plurality of forwarding tables, including a first entry indicating a first next hop as an equal cost multipath next hop for a particular destination of the set of destinations, and
a second forwarding table, of the plurality of forwarding tables, including a second entry indicating a second next hop as an equal cost multipath next hop for the particular destination; and
combining, by the network device, the plurality of forwarding tables into a single forwarding table,
the single forwarding table being used to forward a multicast packet toward a plurality of destinations, the plurality of destinations including the particular destination, and
the single forwarding table, based on combining the plurality of forwarding tables, including a third entry indicating the first next hop and the second next hop as equal cost multipath next hops for the particular destination.

10. The method of claim 9, further comprising:
programming the single forwarding table into a data plane associated with the network device and used to forward multicast packets.

11. The method of claim 9, where the single forwarding table includes a plurality of possible next hops for each destination of the set of destinations.

12. The method of claim 9, where the network device comprises a bit-forwarding device.

13. The method of claim 9, further comprising:
receiving the multicast packet that includes information identifying destination addresses for the multicast packet;
analyzing the multicast packet to determine a portion of the single forwarding table to use for the multicast packet;
identifying particular next hops associated with the portion of the single forwarding table and associated with the destination addresses; and
forwarding the multicast packet to the particular next hops,
the particular next hops forwarding the multicast packet toward destinations associated with the destination addresses.

14. The method of claim 13, where a hash function is applied to one or more fields of a header of the multicast packet for determining the portion of the single forwarding table to use for the multicast packet.

15. The method of claim 13, further comprising:
creating a copy of the multicast packet for each of the particular next hops; and
where forwarding the multicast packet to the particular next hops comprises:
forwarding the copy of the multicast packet to each of the particular next hops.

16. A bit-forwarding device, comprising:
one or more processors to:
create a plurality of bit index forwarding tables,
each of the plurality of forwarding tables including information associated with a set of destinations;
populate the plurality of bit index forwarding tables with information associated with the set of destinations, a first forwarding table, of the plurality of forwarding tables, including a first entry indicating a first next hop as an equal cost multipath next hop for a particular destination of the set of destinations, and
a second forwarding table, of the plurality of forwarding tables, including a second entry indicating a second next hop as an equal cost multipath next hop for the particular destination; and
combine the plurality of bit index forwarding tables into a single bit index forwarding table,
the single bit index forwarding table, based on combining the plurality of forwarding tables, including a third entry indicating the first next hop and the second next hop as equal cost multipath next hops for the particular destination.

17. The bit-forwarding device of claim 16, where the one or more processors are further to:
store the single bit index forwarding table; and
program the single bit index forwarding table into a data plane used to forward multicast packets.

18. The bit-forwarding device of claim 16, where the single bit index forwarding table includes a plurality of possible next hops for each destination of the set of destinations.

19. The bit-forwarding device of claim 16, where the one or more processors are further to:
receive a multicast packet that includes information identifying destination addresses for the multicast packet;
analyze the multicast packet to determine a portion of the single bit index forwarding table to use for the multicast packet;
identify particular next hops associated with the portion of the single bit index forwarding table and associated with the destination addresses; and
forward the multicast packet to the particular next hops, the particular next hops forwarding the multicast packet toward destinations associated with the destination addresses.

20. The bit-forwarding device of claim 19, where the one or more processors are further to:
create a copy of the multicast packet for each of the particular next hops; and
where, when forwarding the multicast packet to the particular next hops, the one or more processors are to:
forward the copy of the multicast packet to each of the particular next hops.

21. A method, comprising:
creating, by a network device provided in a network, a forwarding table that includes information associated with a set of destinations,
the forwarding table being a combined forwarding table of a plurality of forwarding tables,
a first forwarding table, of the plurality of forwarding tables, including a first entry indicating a first next hop as an equal cost multipath next hop for a particular destination of the set of destinations, and
a second forwarding table, of the plurality of forwarding tables, including a second entry indicating a second next hop as an equal cost multipath next hop for the particular destination;
determining, by the network device, next hops for the set of destinations;
populating, by the network device, the forwarding table with information associated with the determined next hops; and
storing, by the network device, the forwarding table,
the forwarding table being used to forward a multicast packet toward a plurality of destinations,
the plurality of destinations including the particular destination, and
the forwarding table including a third entry indicating the first next hop and the second next hop as equal cost multipath next hops for the particular destination.

* * * * *